(12) United States Patent
Bally et al.

(10) Patent No.: US 7,770,934 B2
(45) Date of Patent: *Aug. 10, 2010

(54) COMPONENT-BASED UTILITY SUPPLY APPARATUS

(75) Inventors: Alex Bally, Barrington, RI (US); Barry D. Wixey, Sanibel, FL (US); John P. Kasten, Lithia, FL (US); Gary M. Schindele, Monteverde, FL (US); James Scott Stewart, Sr., Roswell, GA (US); Eric Colburn, Wexford, PA (US); Tomio Kato, Atlanta, GA (US)

(73) Assignee: Lifespan Healthcare, LLC, Tampa, FL (US)

( * ) Notice: Subject to any disclaimer, the term of this patent is extended or adjusted under 35 U.S.C. 154(b) by 496 days.

This patent is subject to a terminal disclaimer.

(21) Appl. No.: 11/748,057

(22) Filed: May 14, 2007

(65) Prior Publication Data

US 2007/0267209 A1 Nov. 22, 2007

Related U.S. Application Data

(63) Continuation-in-part of application No. 11/419,371, filed on May 19, 2006.

(51) Int. Cl.
*F16L 25/08* (2006.01)

(52) U.S. Cl. .......................... 285/12; 285/64; 285/119; 248/56; 248/65

(58) Field of Classification Search .................. 248/56, 248/65, 68.1, 73; 285/12, 64, 119
See application file for complete search history.

(56) References Cited

U.S. PATENT DOCUMENTS

| | | |
|---|---|---|
| 3,921,345 A | 11/1975 | Damico |
| 4,354,330 A | 10/1982 | Schwartz |
| 4,498,693 A | 2/1985 | Schindele |
| 4,646,211 A | 2/1987 | Gallant et al. |
| 4,720,768 A | 1/1988 | Schindele |
| 4,807,659 A | 2/1989 | Schindele |
| 4,821,470 A | 4/1989 | Kappers et al. |
| 4,869,378 A | 9/1989 | Miller |
| 4,896,700 A | 1/1990 | Stoll |
| 4,905,433 A | 3/1990 | Miller |
| 4,924,036 A | 5/1990 | Shyu |
| 4,942,271 A | 7/1990 | Corsi et al. |
| 5,152,394 A | 10/1992 | Hughes |
| 5,553,892 A | 9/1996 | Pitchford et al. |

(Continued)

*Primary Examiner*—Amy J Sterling
(74) *Attorney, Agent, or Firm*—Barlow, Josephs & Holmes, Ltd.

(57) ABSTRACT

A component-based utility supply apparatus includes a wall-mounting bracket, a utility distribution unit mounted to the wall mounting bracket and an equipment management rail. The wall mounting bracket includes a longitudinally extending wall mounting flange and a support bracket having an upper supporting flange and a lower supporting flange that are interconnected via a rear wall extending therebetween, the rear wall being attached to the mounting bracket. The utility distribution unit can comprise a fluid (gas) manifold, or a power distribution assembly, or both the gas manifold and the power distribution assembly may be coupled together with the wall mounting bracket and equipment rail to provide a combined power and gas utility configuration. The utility supply apparatus further comprises integrated lighting devices and light transmissive lens panel for supplying light along at least a portion of the utility supply apparatus.

4 Claims, 35 Drawing Sheets

U.S. PATENT DOCUMENTS

| | | |
|---|---|---|
| 5,653,064 A | 8/1997 | Kappers et al. |
| 5,658,066 A | 8/1997 | Hirsch |
| 5,676,133 A | 10/1997 | Hickle et al. |
| 5,756,933 A | 5/1998 | Pitchford et al. |
| 5,878,536 A | 3/1999 | Demmitt et al. |
| 5,890,326 A | 4/1999 | Gallant et al. |
| 5,966,760 A | 10/1999 | Gallant et al. |
| 5,988,076 A | 11/1999 | Vander Park |
| 6,012,821 A | 1/2000 | Yeaney et al. |
| 6,019,481 A | 2/2000 | Ambach et al. |
| 6,076,543 A | 6/2000 | Johnson |
| 6,084,180 A | 7/2000 | DeBartolo, Jr. et al. |
| D434,502 S | 11/2000 | Gallant |
| 6,145,253 A | 11/2000 | Gallant et al. |
| D443,365 S | 6/2001 | Walker |
| 6,243,993 B1 | 6/2001 | Swensson |
| 6,256,935 B1 | 7/2001 | Walker |
| 6,256,936 B1 | 7/2001 | Swensson |
| 6,269,594 B1 | 8/2001 | Walker |
| D450,131 S | 11/2001 | Lehrich |
| 6,325,097 B1 | 12/2001 | Gallant et al. |
| 6,328,458 B1 | 12/2001 | Bell et al. |
| 6,347,643 B1 | 2/2002 | Cope, III et al. |
| 6,360,389 B1 | 3/2002 | Gallant et al. |
| 6,382,242 B1 | 5/2002 | Gallant et al. |
| 6,405,491 B1 | 6/2002 | Gallant |
| 2003/0021107 A1 | 1/2003 | Howell et al. |

COMPONENT-BASED UTILITY SUPPLY APPARATUS

CROSS-REFERENCE TO RELATED APPLICATIONS

This application is a Continuation-in-Part of and claims priority from earlier filed U.S. patent application Ser. No. 11/419,371, filed May 19, 2006.

BACKGROUND AND SUMMARY OF THE INVENTION

The instant invention relates to wall mounted systems for delivering fluid and power to hospital rooms and laboratory facilities, and more particularly to a component-based system that can be easily installed and configured to provide equipment management, or fluid and equipment management, or power and equipment management, or fluid, power and equipment management, all further including an integrated lighting system and improved interconnection systems.

Wall mounted systems for delivering utilities, such as fluid (gases and liquids) and power to hospital rooms and laboratory facilities are known in the art. Furthermore, component-based wall-mounted systems for delivering fluid and power to hospital rooms are also known in the art. For example, the US Patents to Pitchford et al U.S. Pat. Nos. 5,553,892 and 5,756,993 disclose modular systems for delivering fluid and/or power to hospital rooms.

While each of the systems in the prior art has its own unique features, each of these systems is also somewhat difficult to install, requiring excessive amounts of labor at the installation site. In particular, the prior art systems are directed to fluid rail systems in which the fluid conduits of separate fluid modules are connected with brazed pipe fittings. Such plumbing connections are labor intensive and costly. Each of the prior art systems also has many exposed joints and gaps in the external surfaces, which promote the collection of dust and debris, making these systems difficult to clean and sanitize. Finally, few, if any, of the prior art systems include an integrated lighting system.

The instant invention provides a component-based utility supply apparatus including a mounting bracket, a utility distribution unit (power or fluid) mounted to the mounting bracket and an equipment management rail. The mounting bracket includes a longitudinally extending wall mounting flange and at least one longitudinally extending supporting flange. The utility distribution unit can comprise a fluid (gas) manifold, or a power distribution assembly, or both the fluid manifold and the power distribution assembly may be coupled together to provide a combined power and gas utility supply configuration. The utility supply apparatus further comprises integrated lighting devices and light transmissive lens panel for supplying light along at least a portion of the utility supply apparatus. Multiple utility supply units can be coupled together in linear alignment to provide custom lengths suitable for use in any size room. Customized alignment plates interfittingly engage between side-by-side units to properly space the units and properly align the units for acceptance of standard cover panels. All of the exterior surfaces of the various components are configured and arranged to merge together to form continuous contoured surfaces that are easy to clean and sanitize.

Accordingly, among the objects of the instant invention are: the provision of a component-based system for delivering and managing utilities and equipment;

the provision of such a component-based utility and equipment management system that can be configured in a plurality of different configurations depending on the needs of the facility;

the provision of such a component-based utility and equipment management system that is easy to configure, install and adapt to various needs;

the provision of a component-based utility and equipment management system that includes integrated lighting elements;

the provision of a component-based utility and equipment management system where the fluid connections comprise simplified O-ring flanged fittings and o-ring seals that do not require brazing operations; and the provision of a component-based utility and equipment management system that can be configured to provide either equipment management, or fluid and equipment management, or power and equipment management, or fluid, power and equipment management as determined by the needs of the facility.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
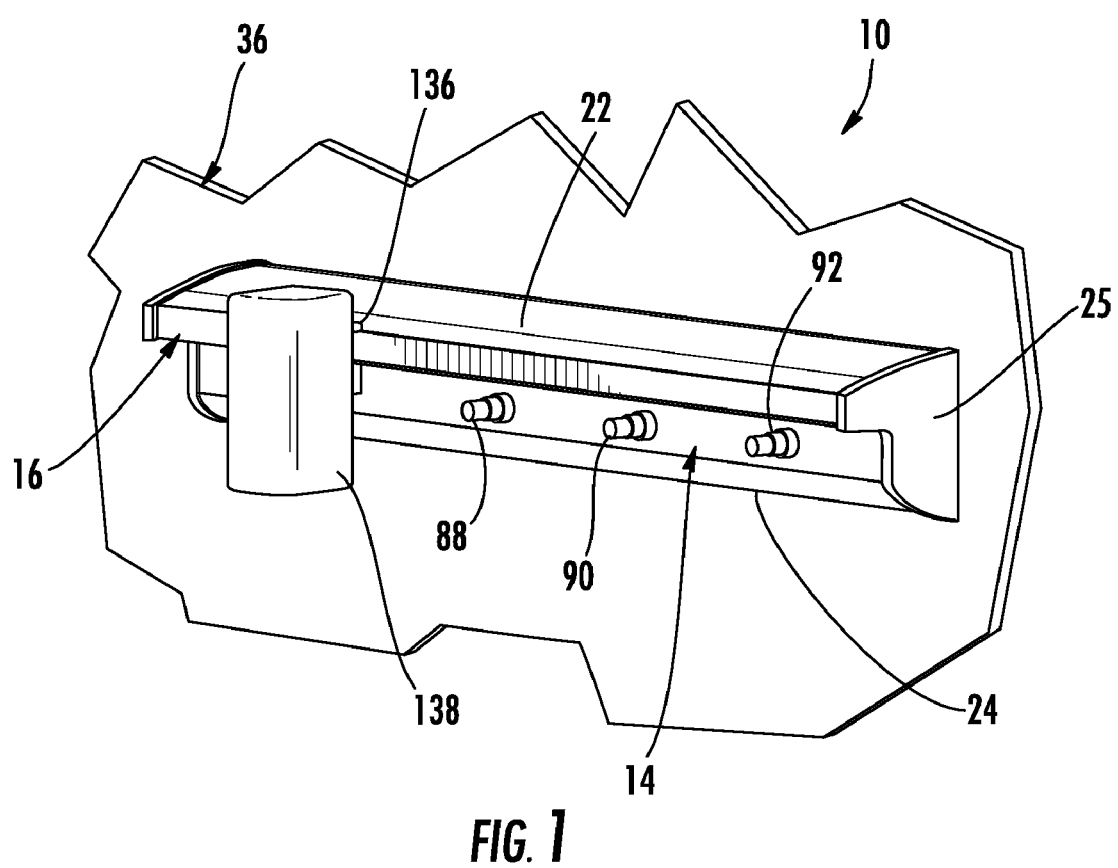
FIG. 1 is a perspective view of a component-based fluid and equipment management assembly in accordance with the teachings of the present invention.

Referring now to the drawings, a fluid and equipment management configuration of the component-based utility supply apparatus of the instant invention is illustrated and generally indicated at 10 in FIGS. 1-12. A power and equipment management configuration is illustrated and generally indicated at 200 in FIGS. 13-23, a combined power, fluid and equipment management configuration is illustrated and generally indicated at 300 in FIGS. 24 and 25, an equipment management configuration is illustrated and generally indicated at 400 in FIG. 26, an alternate embodiment combined power, fluid and equipment management configuration is illustrated and generally indicated at 500 in FIGS. 27-32, and a fluid apparatus is illustrated and generally indicated at 600 in FIG. 33.

As will hereinafter be more fully described, the instant invention provides a component-based utility supply system, which can be arranged in several different configurations to provide equipment management, fluid (gas) and equipment management, power and equipment management, or power, gas and equipment management, all configurations optionally including integrated lighting components, such as fluorescent lighting. Each utility configuration is uniquely designed with components, cover panels, end panels and lens panels that merge together at their transition edges to provide continuous outer surface contours that are both aesthetically pleasing and easy to clean and sanitize. The components of the component-based system are also easy to install and to couple together in side-by-side arrangements to provide custom length units.

The term "fluid", as used in this specification, refers to liquids and gases. In hospitals and laboratories, typical gases include oxygen, air and nitrogen; typical liquids may include water. Fluid pressure through the present invention can be either positive or negative (vacuum). That is, fluids can be delivered from the facility through this invention and into the particular room where the invention is installed (positive pressure), or the fluid can originate in the particular room, and travel through this invention to a further collection or distribution point in the facility. An example of the use of negative pressure for fluids is the use of suction (vacuum) to evacuate bodily fluids in a hospital, or to crate a vacuum in a laboratory.

In this specification, "fluid supply line" encompasses the delivery of fluids and gases, and further encompasses reversed flow, where fluids and gases may flow toward the facility, as may be the case with vacuum and suction arrangements.

The term "power", as used in this specification, refers to electrical current flow, and includes electricity, telephone, data, cable television, fax and other similar low voltage electrical circuits. In hospitals and laboratories, typical electric circuits include 120v and 240v alternating currents, and low voltage (12v and 24v) alternating and direct current circuits. In this specification, "power supply line" encompasses the delivery of electricity as well as two-way electrical communications as found with telephone, data, and cable transmission lines.

Turning back to FIGS. 1-12, the fluid and equipment management assembly 10 comprises a mounting bracket generally indicated at 12, a fluid manifold generally indicated at 14, an equipment management rail generally indicated at 16, lighting components 18, 20, lighting lens panels 22, 24, and end panels 25.

With respect to the preferred embodiments illustrated herein, all of the elongated mounting brackets and components are preferably formed as extruded aluminum parts. However, the use of other metals and manufacturing techniques is also contemplated. Plastic and composite materials may also be used in selected areas of the system, where found to be appropriate for material handling, building codes and other requirements.

Figure 3:
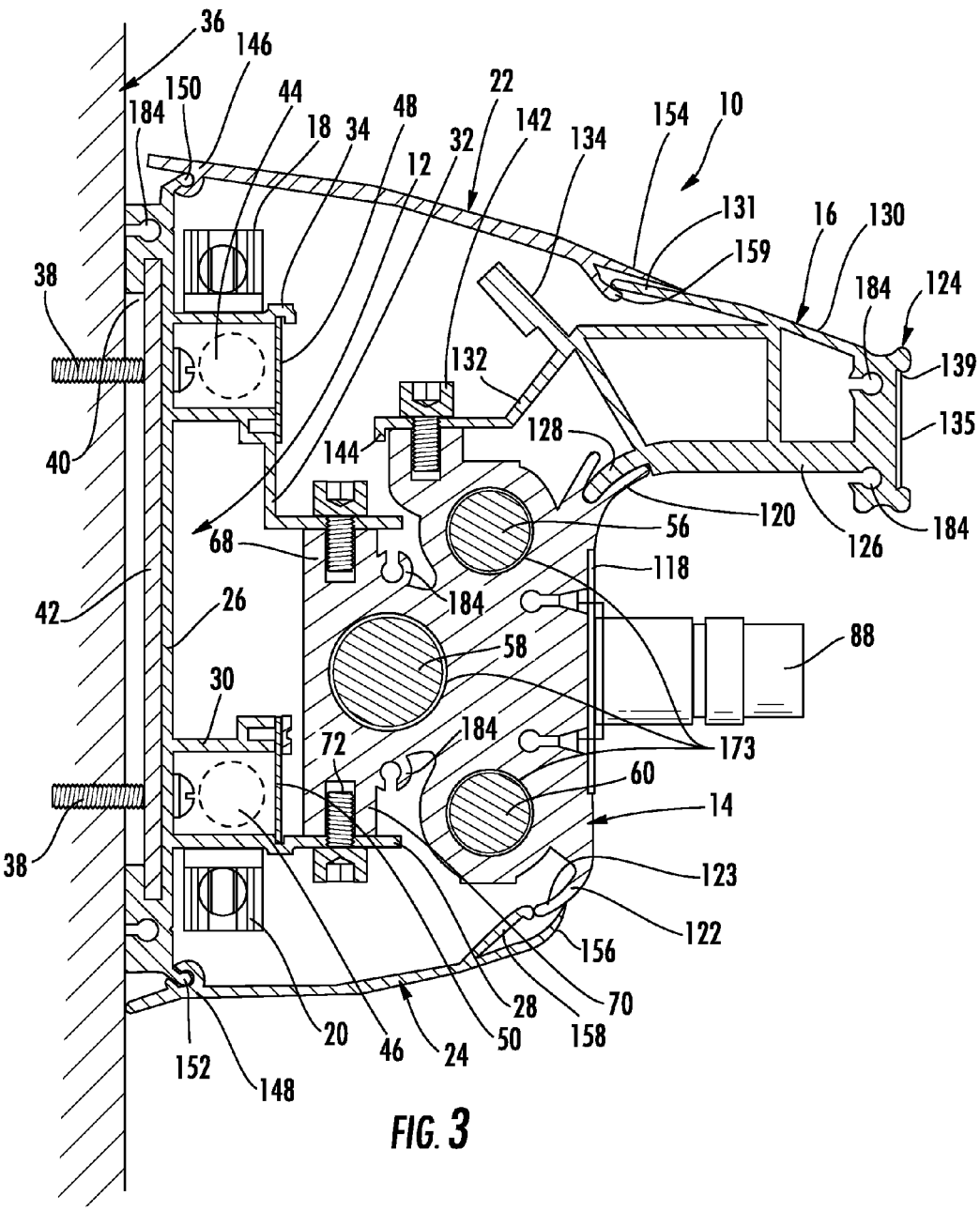
FIG. 3 is an end view of the component-based fluid and equipment management assembly.
Figure 4:
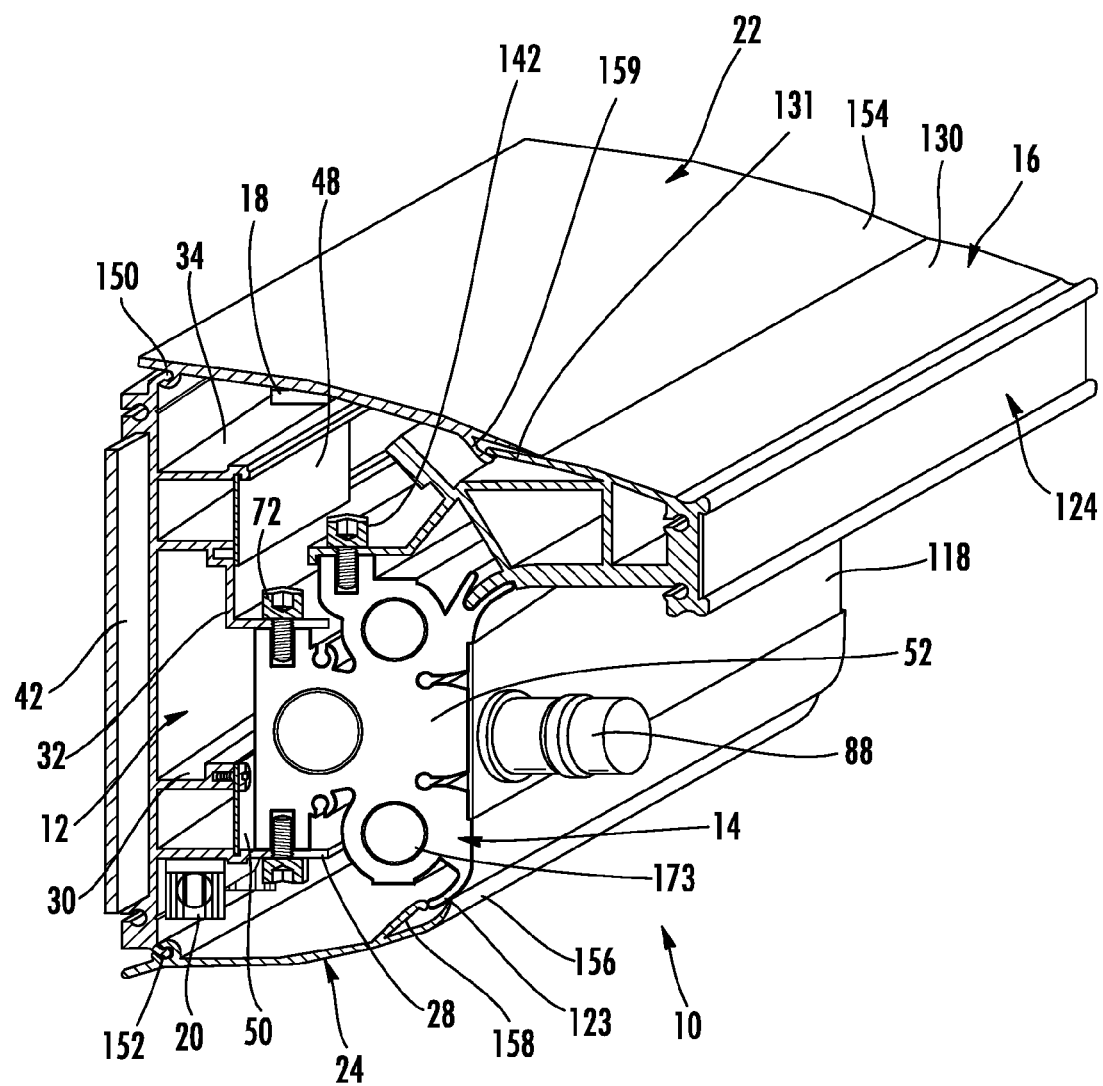
FIG. 4 is a perspective end view thereof.
Figure 5:
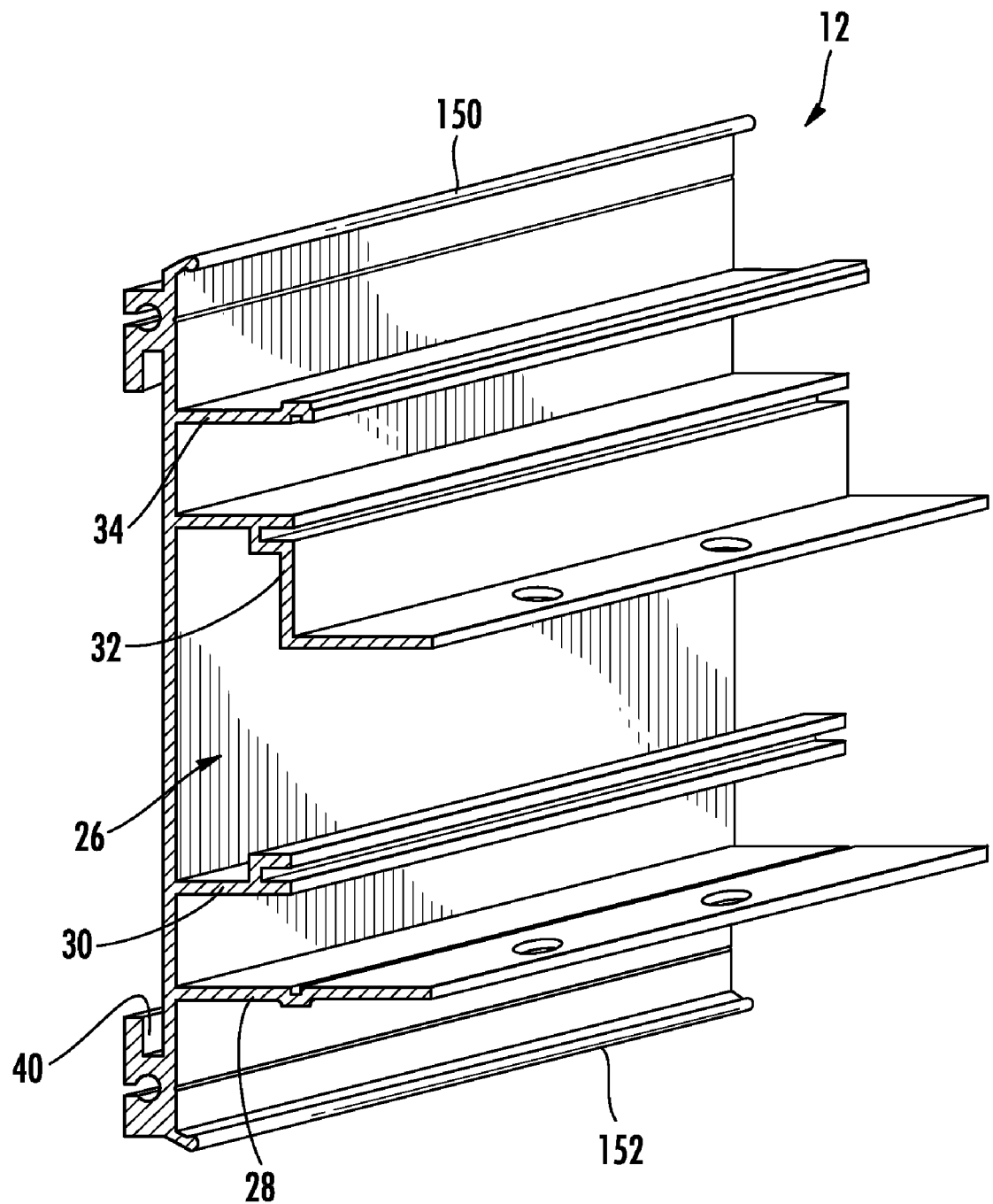
FIG. 5 is a perspective view of the mounting bracket.
Figure 6:
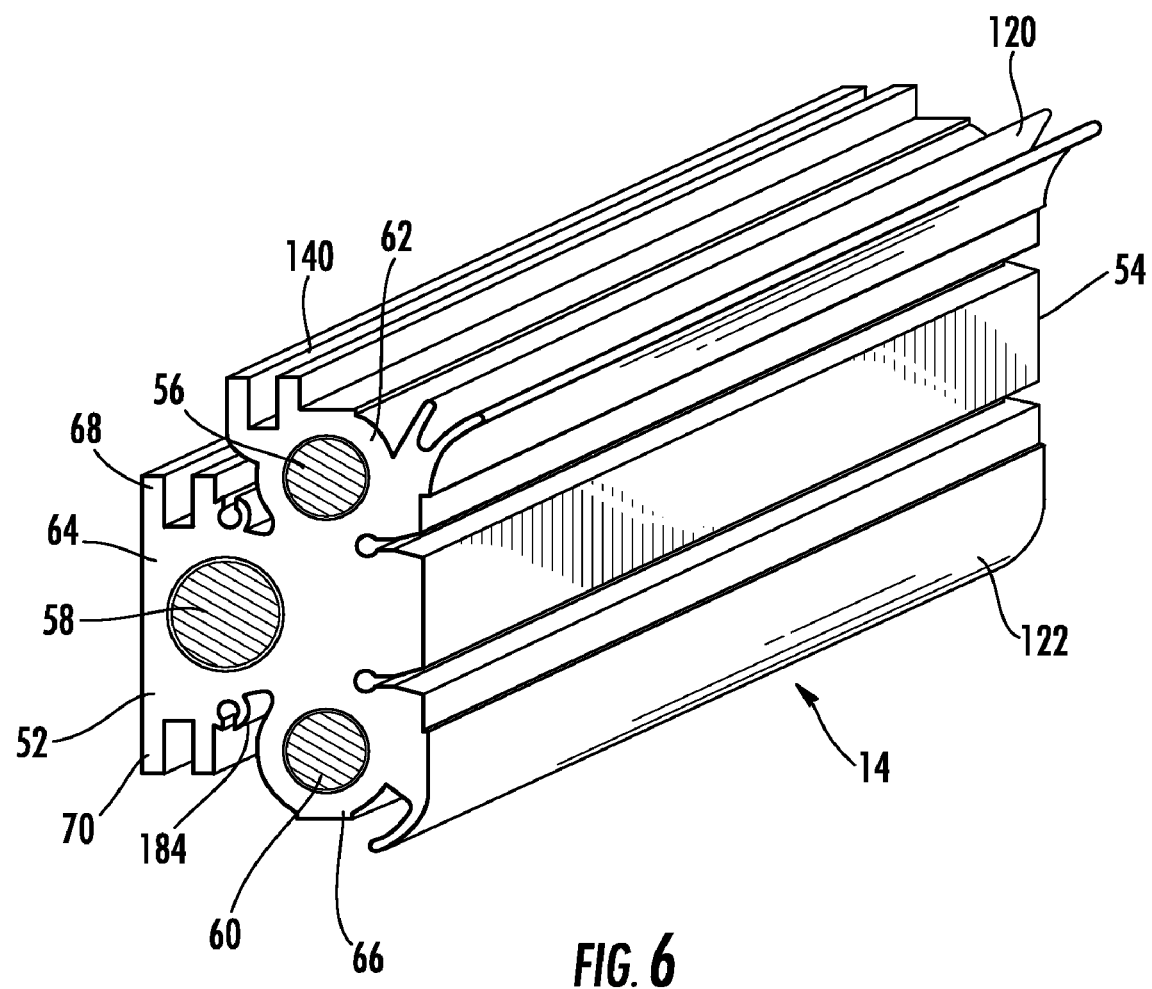
FIG. 6 is a perspective view of the fluid manifold.

Referring to FIGS. 3-5, the mounting bracket 12 comprises a vertically oriented, longitudinally extending wall mounting flange 26, and a plurality of supporting flanges 28, 30, 32, 34 extending outwardly from the front surface of the wall mounting flange 26. The wall mounting flange 26 is configured and arranged to be secured to a vertically oriented wall structure 36 with threaded mounting screws or bolts 38, or other appropriate wall fasteners. The wall mounting flange 26 further includes a channel structure 40 on the rear surface to accommodate a splicing plate 42, used to couple two side-by-side units together. Referring now to the supporting flanges, there are first and second lower supporting flanges 28, 30 and first and second upper supporting flanges 32, 34. The first, lower and upper supporting flanges 28, 32 are slightly longer and are utilized for mounting of the fluid manifold. The second lower and upper supporting flanges 30, 34 cooperate with the first upper and lower supporting flanges 28, 32 to define wiring ducts 44, 46 for the lighting components 20, 22. Cover panels 48, 50 are secured over the wiring ducts 44, 46 to isolate the wiring from the rest of the unit.

The fluid manifold 14 is preferably formed as an extruded aluminum part and has an elongated body with opposing end faces 52, 54. However, the use of other metals and manufacturing techniques is also contemplated. Plastic and composite materials may also be used in selected areas of the system, where found to be appropriate for material handling, building codes and other requirements. Preferably, three separate fluid conduits 56, 58, 60 extend through the body between the end faces 52, 54. While there are three conduits shown in the illustrated embodiment, it is to be understood that the invention is not to be limited by the illustrated number of fluid conduits. These three separate fluid conduits 56, 58, 60 generally define three separate lobe structures 62, 64, 66 for the fluid manifold. The central lobe 66 includes upper and lower mounting shoulders 68, 70 that are configured and arranged to be received between the first upper and lower supporting flanges 28, 32 on the mounting bracket 12. These mounting shoulders 68, 70 are snugly received between the supporting flanges 28, 32 and are secured in place with threaded fasteners 72 at various locations along the length thereof.

Figure 2:
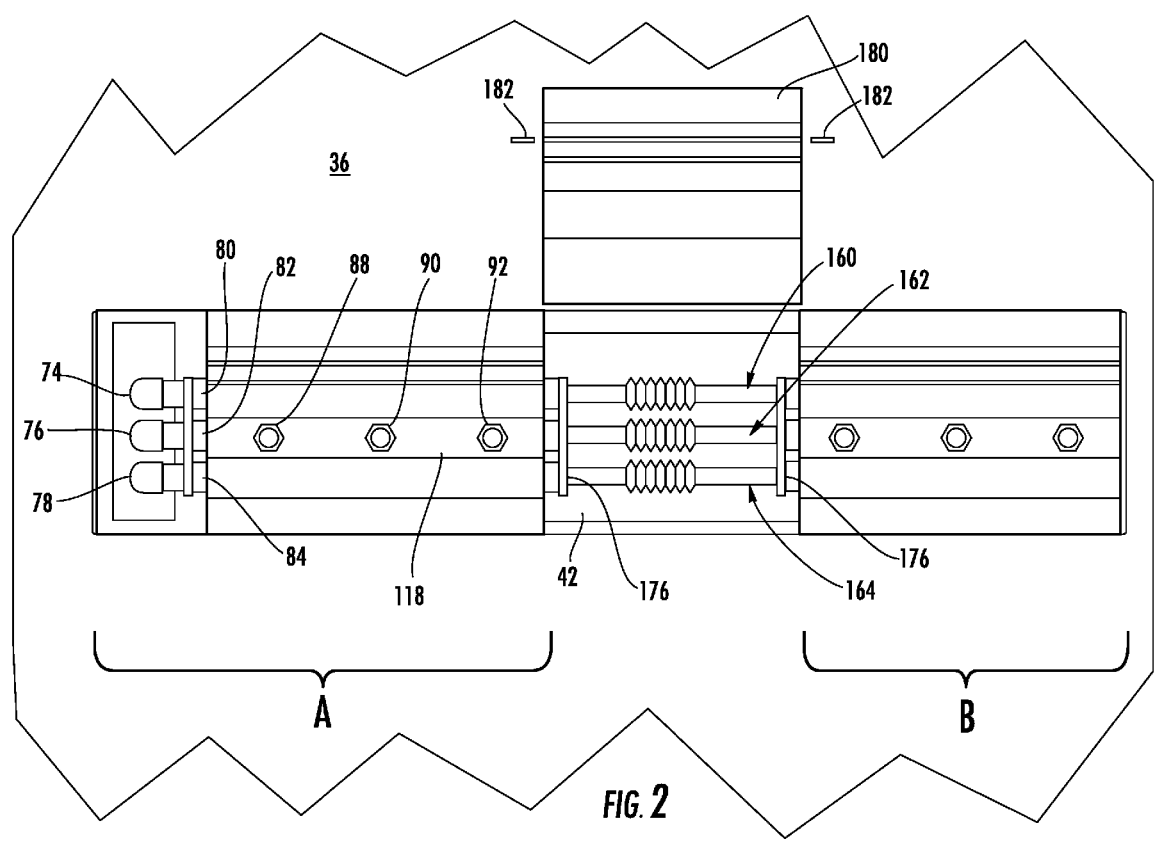
FIG. 2 is a front elevation view of two component-based fluid and equipment management assemblies interconnected with a manifold connection assembly.
Figure 9:
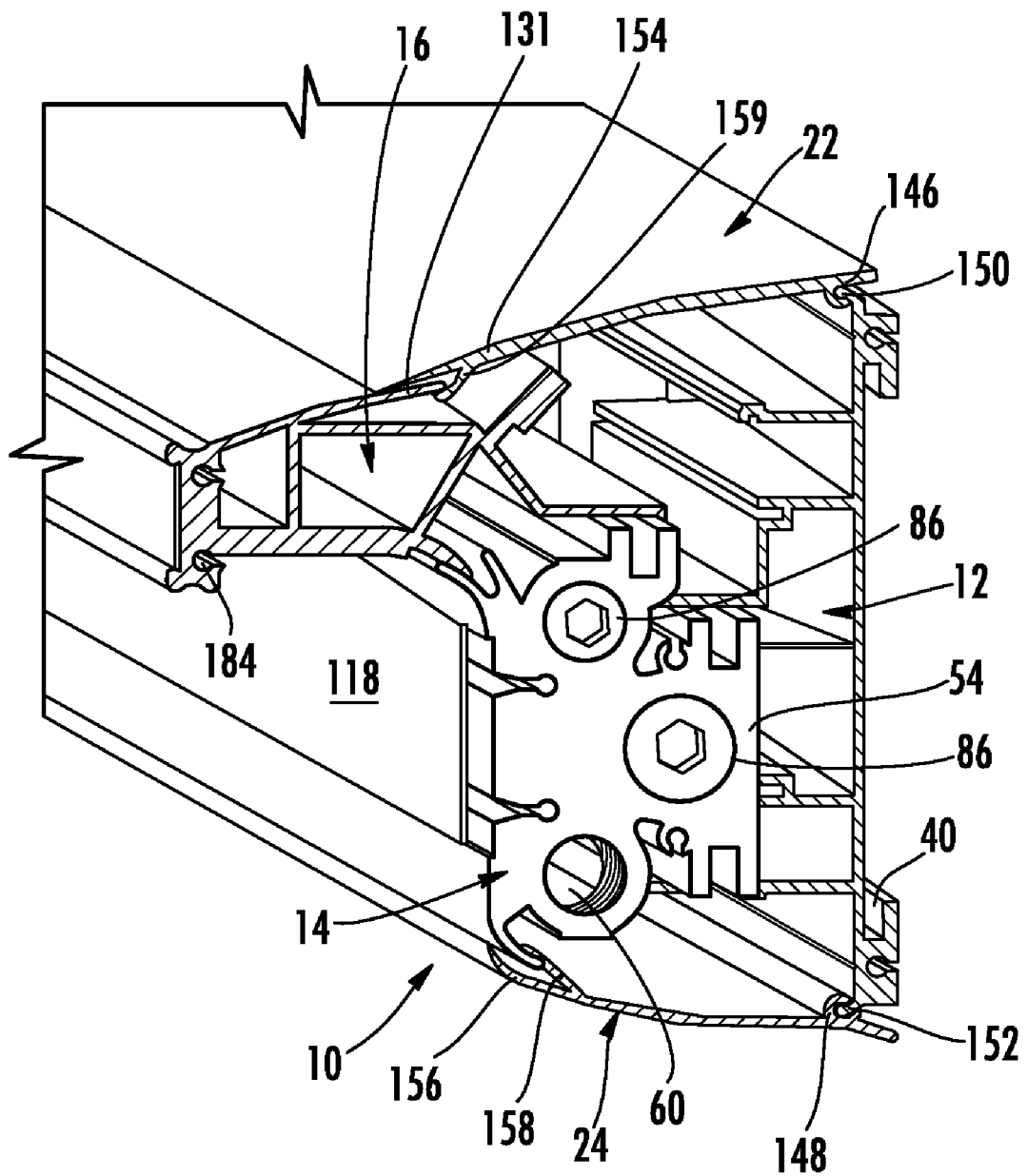
FIG. 9 is a perspective view of the opposing end of the component-based fluid and equipment management assembly.

Referring briefly to FIGS. 2 and 3 each of the fluid conduits 56, 58, 60 may be connected to a corresponding fluid supply line 74, 76, 78 located in the supporting wall 36 adjacent to the mounting point of the utility supply 10 assembly. The end faces 52, 54 of the fluid manifold 14, as shown in FIGS. 4 and 9 are machined substantially flat and true, and the fluid conduits 56, 58, 60 can be provided with bored and tapped ends (see FIG. 9), preferably to receive standard pipe fittings. Pipe couplings 80, 82, 84 are installed in the bored and tapped ends of the fluid conduits 56, 58, 60 for connection to the facility fluid supply lines 74, 76, 78. Preferably known pipe couplings are utilized for the fluid connections. However, any suitable connection methods, including crimping, brazing, compression fittings and/or O-ring flanged fittings may be used. On the opposing end of the fluid conduits 56, 58, 60, plugs 86 may be installed to seal the end of a conduit (See also FIG. 9).

Figure 8A:
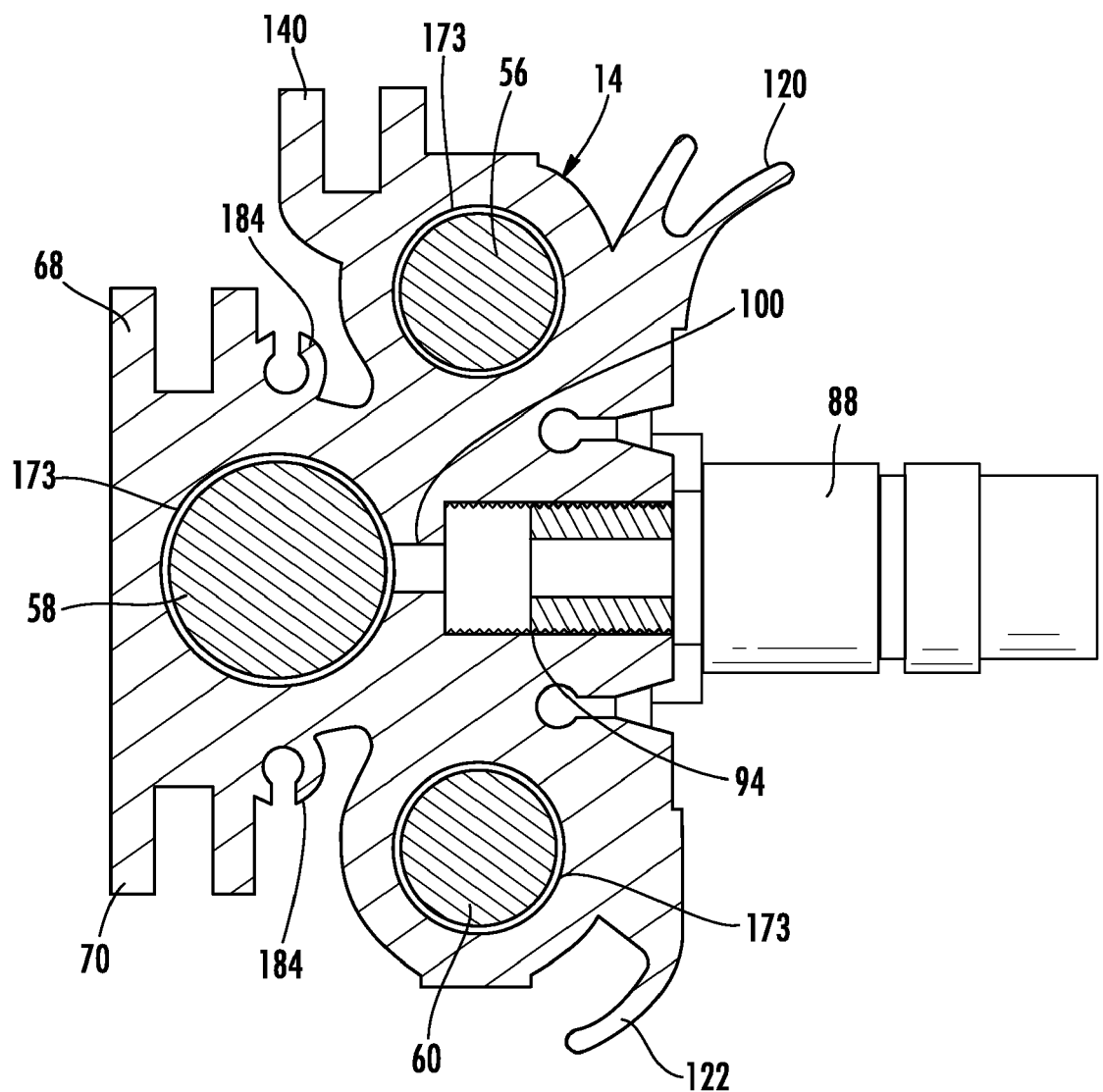
FIGS. 8A-8C are cross-sectional views showing fluid connection of each of the fluid conduits to a respective one of the fluid delivery outlets.
Figure 8B:
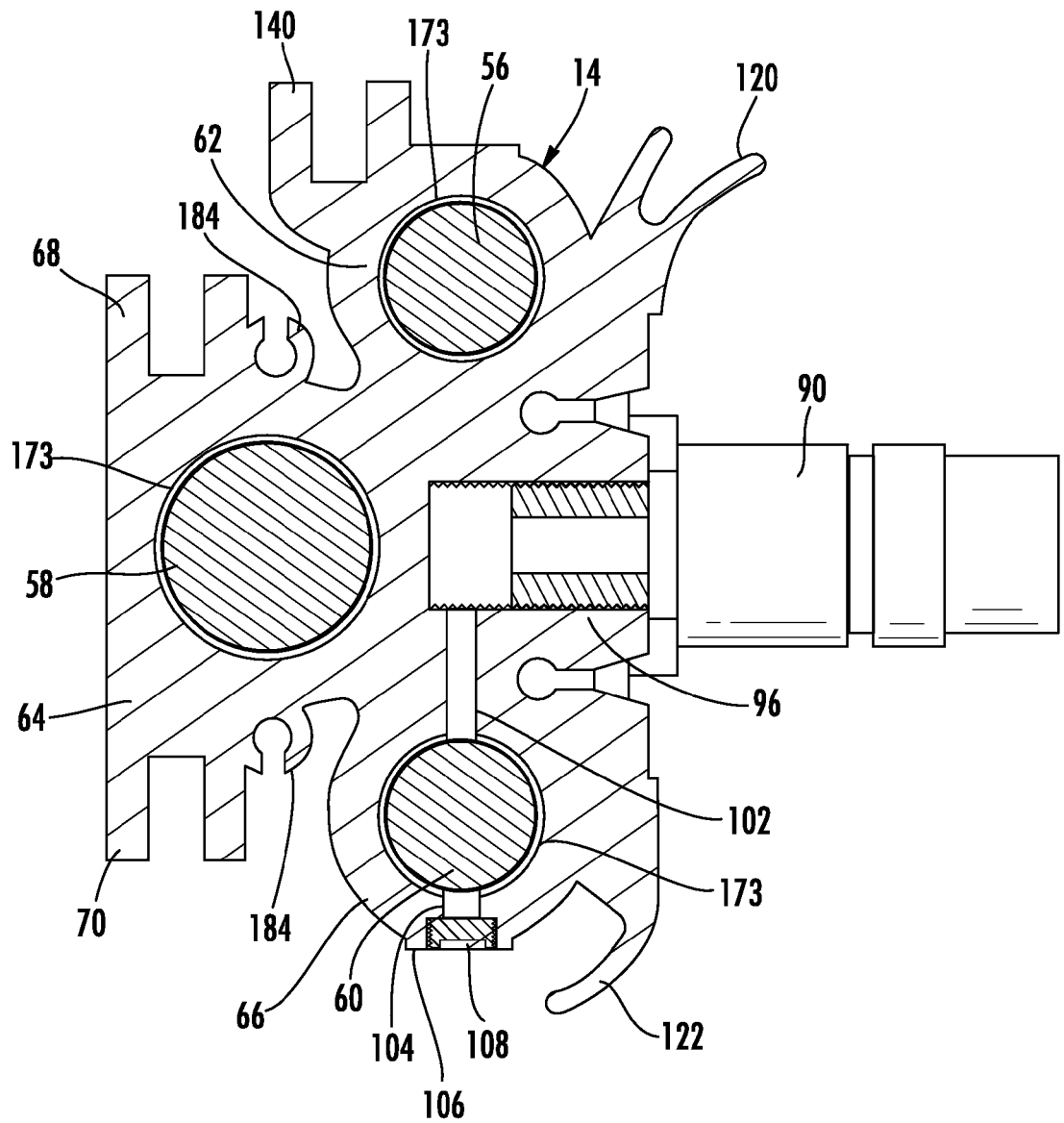
Figure 8C:
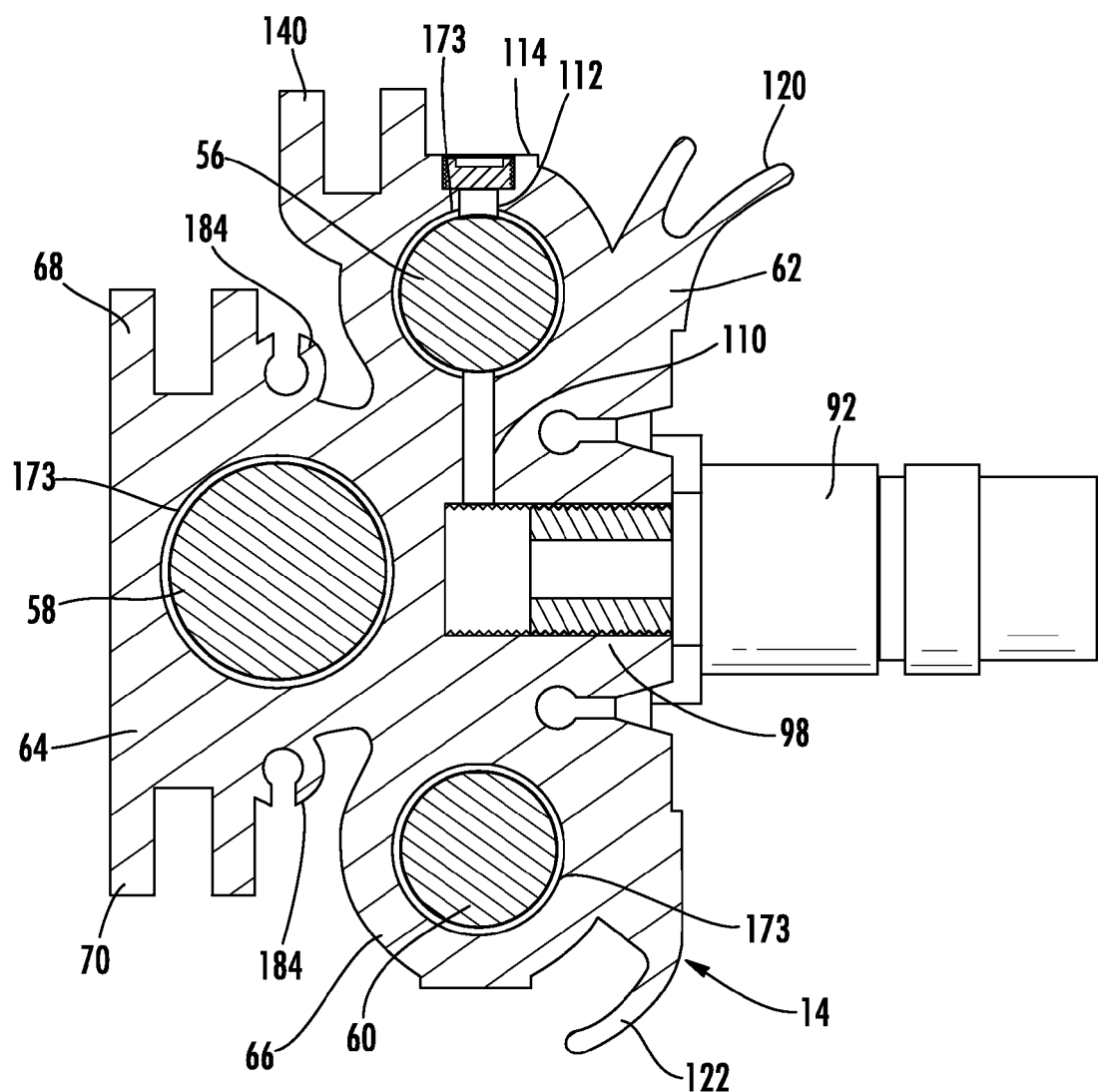

Commercially available fluid outlet fittings 88, 90, 92 (DISS gas outlet fittings) are installed in the front face of the fluid manifold 14. Referring to FIGS. 8A-8C, outlets 88, 90, 92 may be fastened into threaded ports 94, 96, 98 that have been machined into the front face of the fluid manifold. Fluids from the facility fluid supply lines 74, 76, 78 may flow into a specific threaded port 94, 96, 98 through a fluid passage that has been previously drilled for the specific port. The orientation and number of fluid passages between the fluid conduits and a specific port determines which fluid will be delivered to the individual port. Referring to FIG. 8A, the fluid outlet port 94 is connected to the central fluid conduit 58 through a port 100 drilled into the bottom of the outlet port 94. Referring to FIG. 8B, the fluid outlet port 96 is connected to the lower fluid conduit 60 through a port 102 drilled into the side of the outlet port 96. More specifically, a through hole 104 is drilled straight through the fluid conduit 60 from the outside of the lower lobe 66. In this regard, the outer surface of the lower lobe 66 is provided with a flat drilling shoulder 106 to facilitate drilling of the through hole 104. The port 102 is drilled until the connection to the outlet port 96 is completed, and then the outer section of the hole 104 is drilled again and tapped to receive a plug 108 to seal the opening. This arrangement is considered to be an improvement over the prior art wherein the connection ports had to be drilled from within the outlet port. In the prior art, this drilling arrangement was awkward, and often damaged the internal threads. The present arrangement provides a more stable way to grasp the fluid manifold, and a flat outer surface on which to start the drilling operation. More reliable and consistent results are obtained. Referring to FIG. 8C, the fluid outlet port 98 is connected to the upper fluid conduit 56 in the same manner through the upper lobe 62 including upper port 110, upper through port 112, upper drilling shoulder 114, and plug 116.

Installed in the front face of the fluid manifold is a decorative vinyl face plate 118 (See FIGS. 1, 3 and 4), which can be used for labeling of the fluid outlets 88, 90, 92, and can be color matched to the décor of the room in which the system is installed.

The upper lobe 62 further includes an elongated mounting channel 120, which is configured and arranged to receive a complementary supporting tongue (described hereinbelow) formed on the equipment rail. The lower lobe 66 includes a rounded corner wall 122 with a contoured outer surface.

Figure 7:
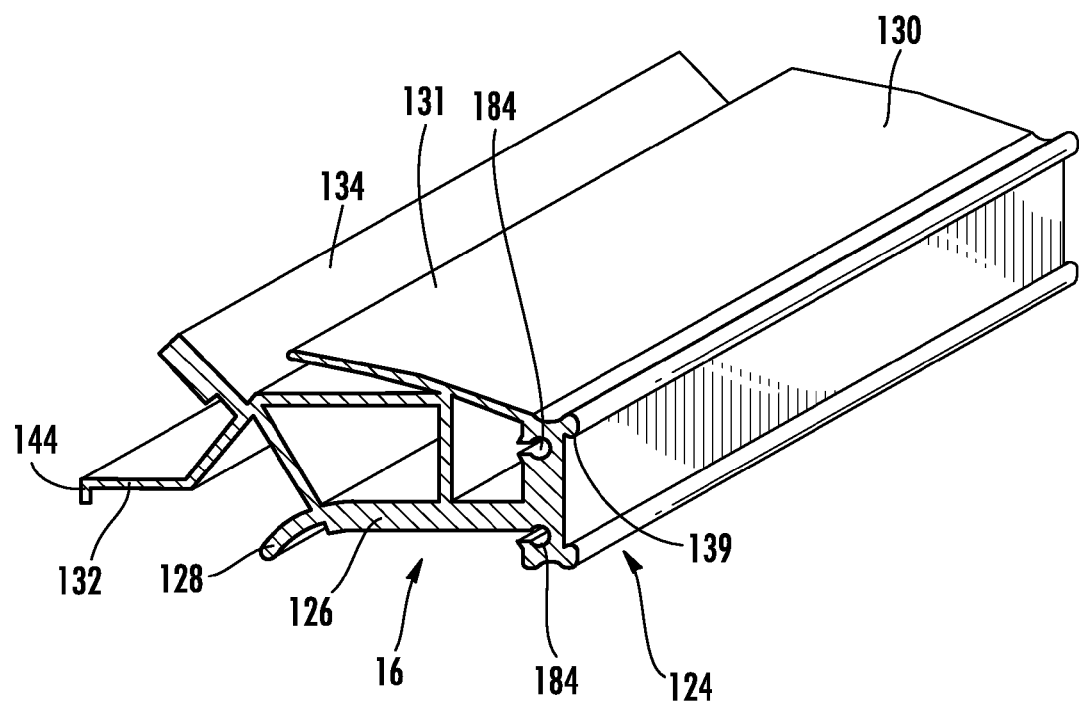
FIG. 7 is a perspective view of the equipment management rail.

Referring to FIGS. 3, 4, and 7, the equipment management rail 16 is an elongated body having main equipment rail 124, a lower wall 126 with a supporting tongue structure 128 at the terminal end thereof, an upper wall 130, a primary mounting flange 132, and a secondary power distribution support flange 134.

The main equipment rail 124 is configured and arranged to have a known cross-sectional profile (see FIGS. 1 and 7), which is suitable for accepting known mounting adapters 136 attached to or formed on commercially available hospital and laboratory equipment 138 (FIG. 1). The front face of the main equipment rail 124 includes opposing undercuts 139, which are configured to receive a decorative face plate 135 that may be color matched to the room decor. The upper and lower walls 126, 130 have smooth contoured outer surfaces. The equipment management rail 16 is received and secured in mounted relation onto the fluid manifold 14 by inserting the supporting tongue 128 into the complementary mounting channel 120 on the upper lobe 62, and securing the primary mounting flange 132 to a complementary mounting boss 140 (also formed on the upper lobe 62 of the fluid manifold), with a fastener 142. The primary mounting flange 132 includes a downwardly extending hook portion 144 that receives and carries the horizontal load vector of the equipment management rail 16. The fastener 142 maintains the hook portion 144 in engagement with the shoulder of the mounting boss 140 for structural support. In the fluid and equipment configuration as shown in FIGS. 1-12, the secondary power-rail mounting flange 134 is not utilized.

When the supporting tongue 128 is received into the complementary mounting channel 120 in the fluid manifold 14, the contoured outer surface of the lower wall 126 merges together with the contoured front surface of the fluid manifold 14 to form a substantially continuous outer contoured surface.

The lighting components 18, 20 preferably comprise elongated fluorescent tube components. These types of components are readily available from a variety of commercial vendors and can be easily integrated into the present system as illustrated. However, it is to be understood that any one of a variety of different lighting components can be used with equal effectiveness. For example, the same lighting can be accomplished with strings of LED or incandescent lights, or a plurality of individually placed LED, incandescent or fluorescent lights.

In the preferred embodiments as illustrated, an upper fluorescent lighting component 18 is mounted on top of the second upper supporting flange 34 so that it is adjacent the upper edge of the mounting flange 26, while a lower fluorescent lighting component 20 is mounted under the first lower supporting flange 28 so that it is adjacent the lower end of the wall mounting flange 26. Ballasts (not shown) for the fluorescent lighting fixtures 18, 20 can be mounted at various locations on the supporting flanges 28, 30, 32, 34, or elsewhere within the system, as appropriate. The placement of the lighting components 18, 20 at the upper and lower edges of the wall mounting flange 26 provides a superior location for both up-lighting and down-lighting of the supporting wall structure 36.

Mounted over the lighting component 18, 20 are the lens, sizes for the upper lens panel 22 and the lower lens panel 24, with both sizes using similar mounting details. These lens panels 22, 24, are preferably manufactured from a light transmissive plastic material, and can be either clear or tinted, optionally with optically refractive and/or reflective characteristics, to provide desired lighting effects with the fluorescent lighting fixture. Both lens panels 22, 24 have a rear edge and a front edge with a contoured surface extending between the two edges. The rear edges of both panels 22, 24 include a hinge channel 146, 148 which are snap received over complementary hinge fulcrums 150, 152 formed on the upper and lower edges of the wall mounting flange 26. The front edges 154, 156 of both panels 22, 24 include opposing clips 158, 159 that are snap received over the respective terminal edges 17, 123 of the upper contoured wall 130 of the equipment management rail 16 and the lower rounded corner 122 of the fluid manifold 14. The lens panels 22, 24, are pivotably movable on the hinge fulcrums 150, 152 to provide access to the fluorescent lights therein for repair and/or replacement. The outer surfaces of lens panels 22, 24, equipment management rail 16 and fluid manifold 16 effectively merge together at their transition edges to provide continuous outer surface contours that are both aesthetically pleasing and easy to clean and sanitize.

Referring now to FIGS. 2 and 10-12, two of the fluid and equipment rail systems (COMPONENT A and COMPONENT B) are joined together in side-by-side relation to form an elongated utility supply system. Economical considerations of manufacturing, such as cost effective aluminum extruding, casting, molding or sheet forming, and practical handling during manufacturing, shipment, and installation, limit the practical maximum lengths of the fluid manifold and equipment management rails. Varying room sizes and facilities may thus require that two or more fluid manifolds be joined in the field to achieve the required total length of a specified installation. In the configuration shown in the FIG. 2, two of the fluid and equipment rail modules 10, 10A are joined together. Generally speaking, in this arrangement, Module A has an inlet end which is connected to the facility fluid supply lines 74, 76, 78 and an outlet end which is connected to the inlet end of Module B. The opposing outlet end of Module B is capped.

The end surfaces of the fluid manifolds 14 are machined substantially flat and true (FIGS. 3 and 4), and the fluid conduits may have bored and tapped ends to receive standard piping connections and/or end caps (FIG. 9). Turning to FIG. 2, the inlet end of Component A is connected with standard piping connections 80, 82, 84 to the facility fluid supply 74, 76, 78. The outlet ends of the conduits of Component B are capped with caps 86 (FIG. 9). The outlet end of Component A is connected to the inlet end of Component B with pipe assemblies generally indicated at 160, 162, 164. It is noted here that the connections can be reversed and can be mixed and matched with other types of connections providing additional flexibility. Preferably, these assemblies 160, 162, 164 comprise flexible copper pipes having corrugated center sections to provide for adjustment. However, other forms of flexible and/or adjustable piping or tubing are also contemplated within the scope of the invention.

Figure 10:
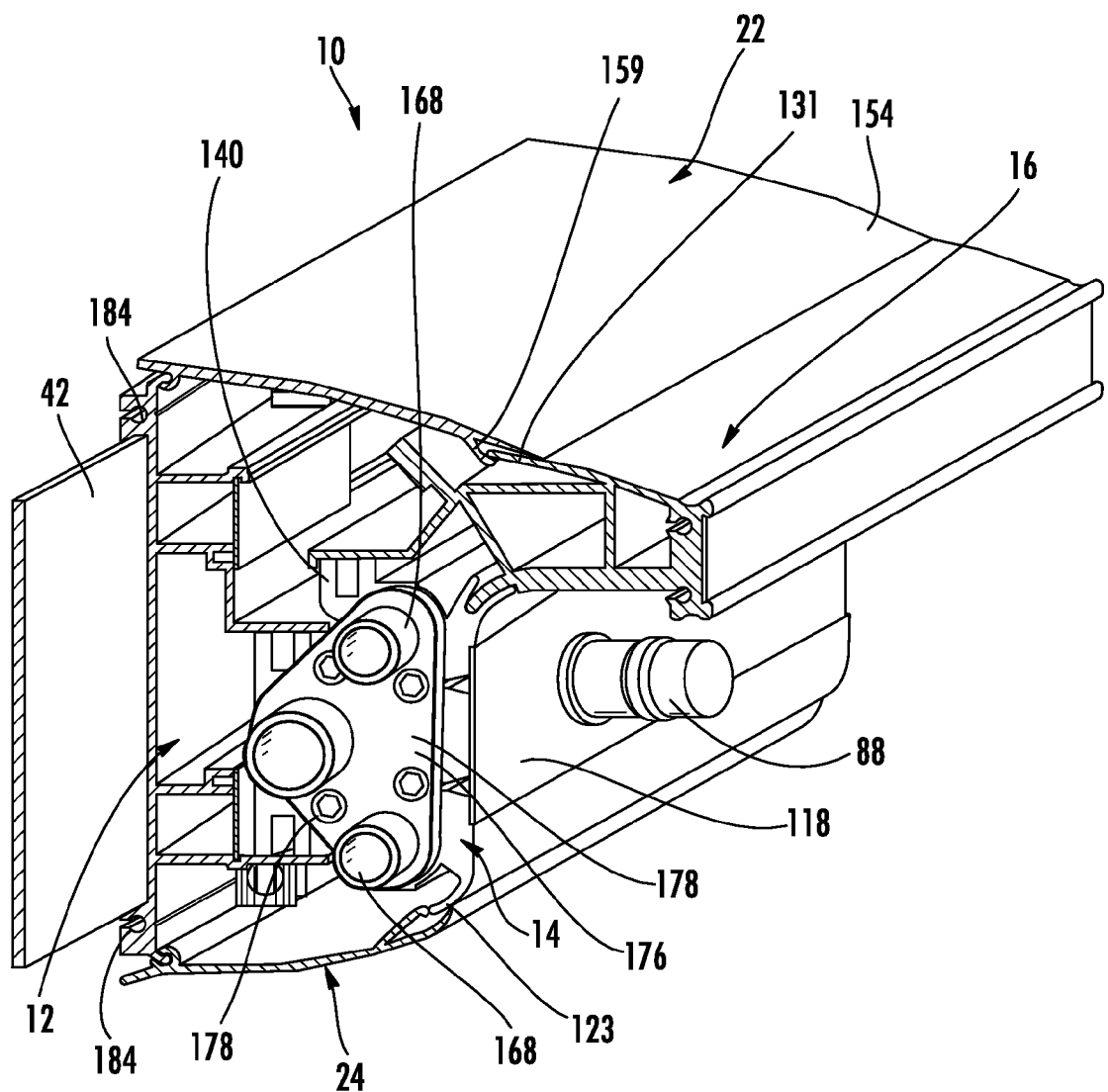
FIG. 10 is a perspective end view of the component-based fluid and equipment management assembly showing the alignment plate and interconnecting fluid fittings of the manifold connection assembly.
Figure 11:
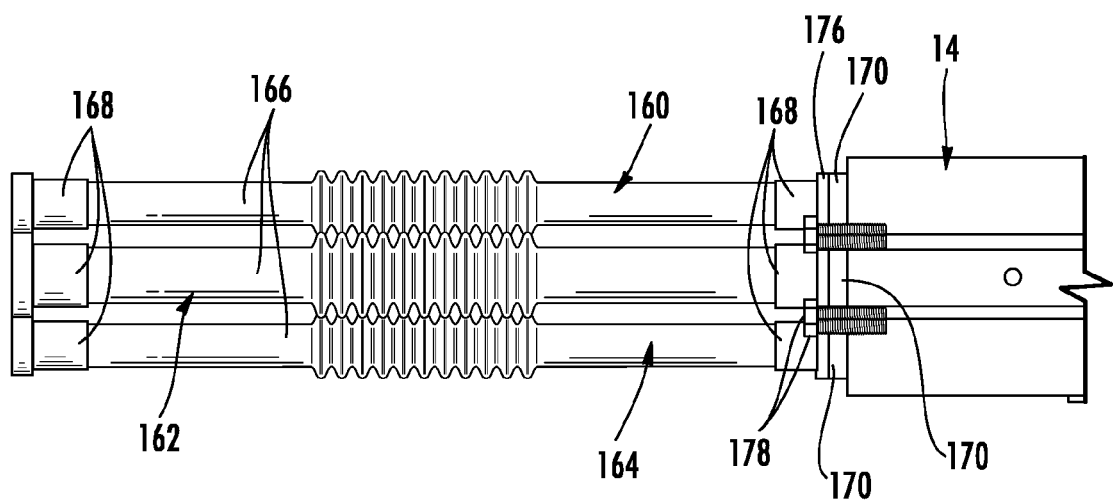
FIG. 11 is a front view of the manifold connection assembly.
Figure 12:
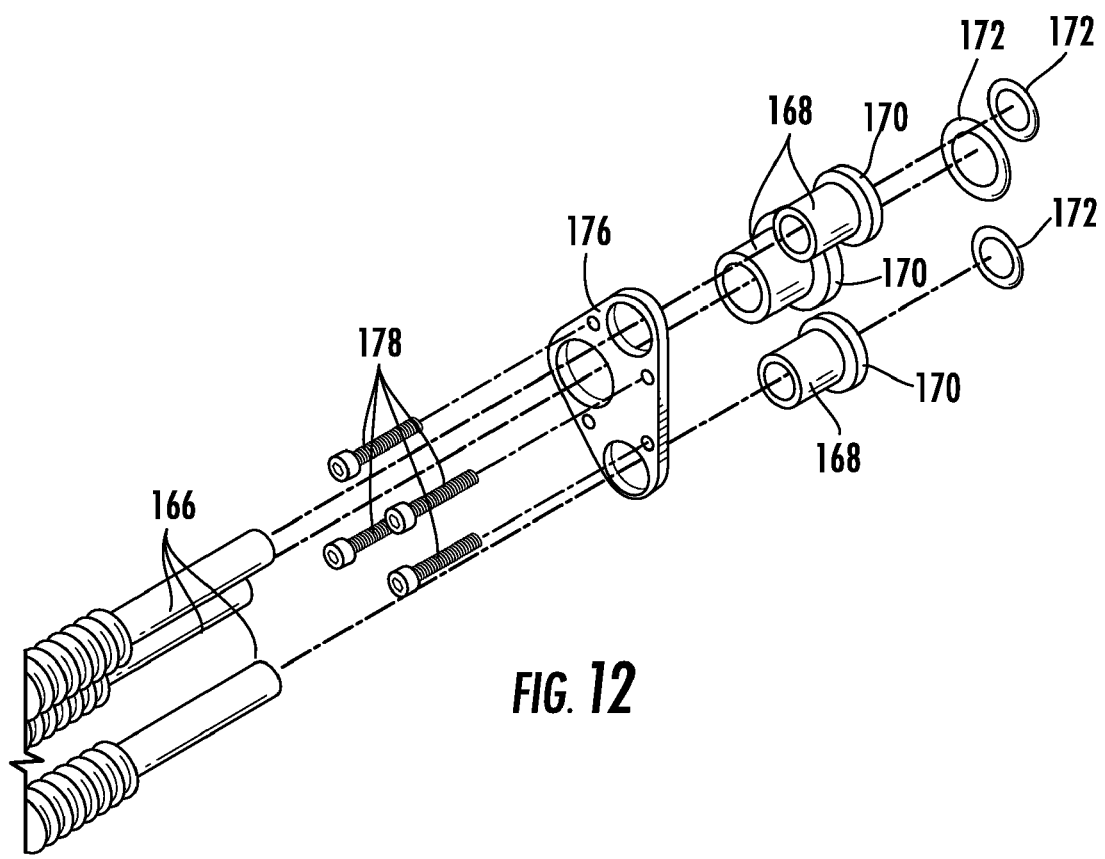
FIG. 12 is an exploded perspective view of the manifold connection assembly.

Turning to FIGS. 10-12, each of the pipe assemblies 160, 162, 164 preferably includes a flexible corrugated copper pipe 166, and a copper pipe coupling 168 brazed or otherwise formed onto each end thereof. The copper pipe couplings 168 each include a connection flange 170 and an O-ring seal 172 received in an O-ring channel 173 formed on the end surface 52 of the fluid manifold 14. The respective ends of the copper pipe assemblies 160, 162, 164 are aligned with the respective fluid conduits 56, 58, 60 and secured to the respective inlet and outlet ends of Components A and B with a connection plate 176 and threaded fasteners 178. The coupling flanges 170 and O-rings 172 are captured between the connection plate 176 and the end surfaces of the fluid manifolds where O-rings 172 sit against the outer ends of the fluid manifolds and are compressed to form a fluid seal. This joining method has the advantaged of permitting the O-rings to be field serviced and replaced after installation, as the corrugated tubing allows release of the flanges and access to the O-rings without a need to loosen or move the installed gas manifolds 14. As indicated above, other suitable connection methods are also contemplated including crimping, brazing, standard compression and O-ring flanged fittings.

Covering the open area between adjacent Components A and B are decorative cover panels 180, that may include all of the external surface features of the combined fluid and equipment management Components A and B, including lens panels 24 and the main equipment rail. The splicing plate 42 and alignment channels 40 consistently provide uniform spacing between the Components A and B so that a standard cover panel 180 can be utilized. The cover panels 180 are aligned with the adjacent component through the use of alignment pins 182 that are received into corresponding bosses 184 provided on the end surfaces of the various components.

Turning now to FIGS. 13-23, a power and equipment management rail configuration is illustrated and generally indicated at 200. The power and equipment configuration comprises a modified wall mounting bracket generally indicated at 212, an equipment rail generally indicated at 16, a power distribution assembly generally indicated at 214, lighting components 18, 20 and lighting lens panels 24A, 24B.

The equipment rail 16 is substantially identical to the equipment rail 16 described hereinabove, and will not be described with respect to the current configuration.

Figure 13:
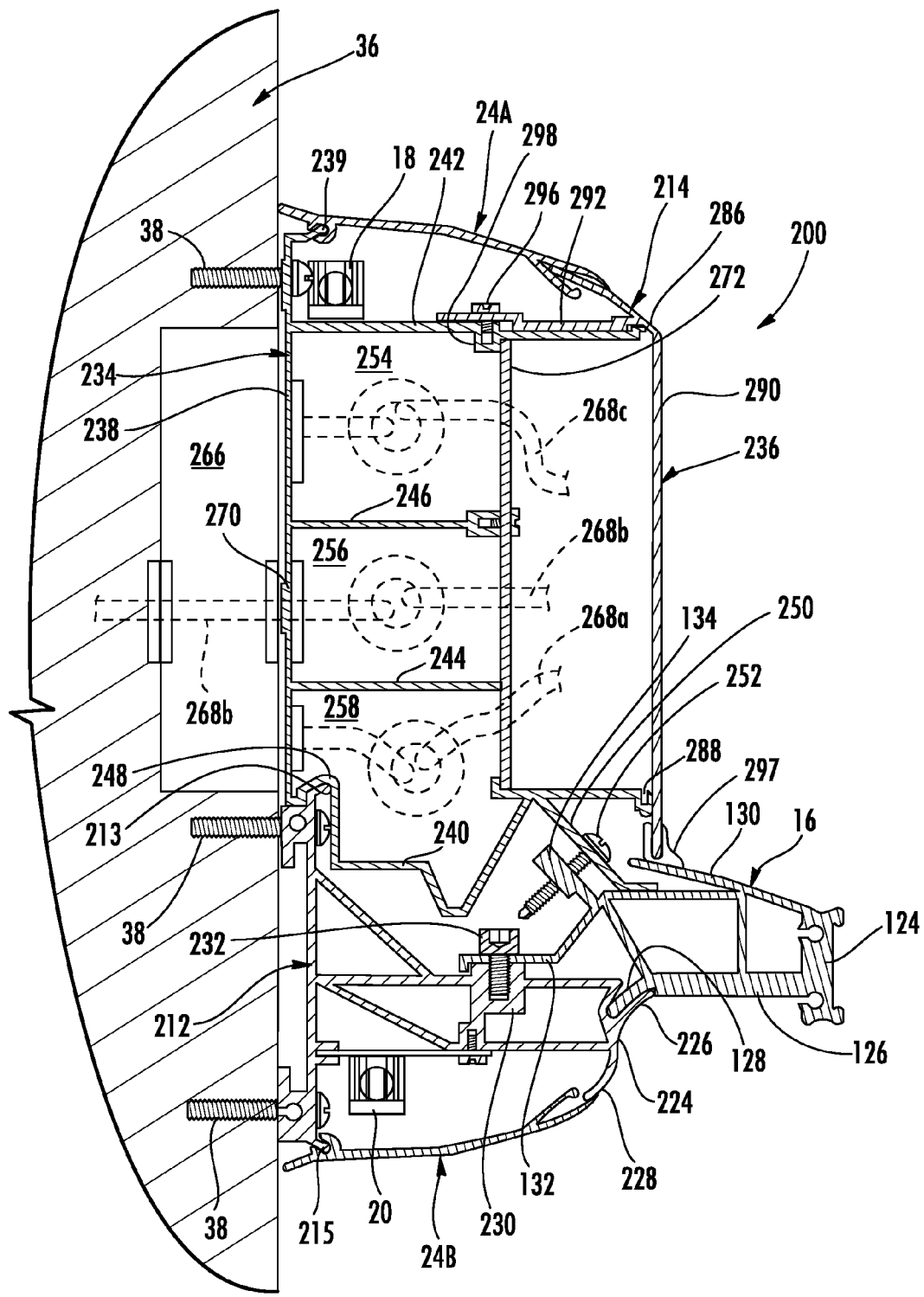
FIG. 13 is an end view of a component-based power and equipment management assembly in accordance with the teachings of the present invention.
Figure 14:
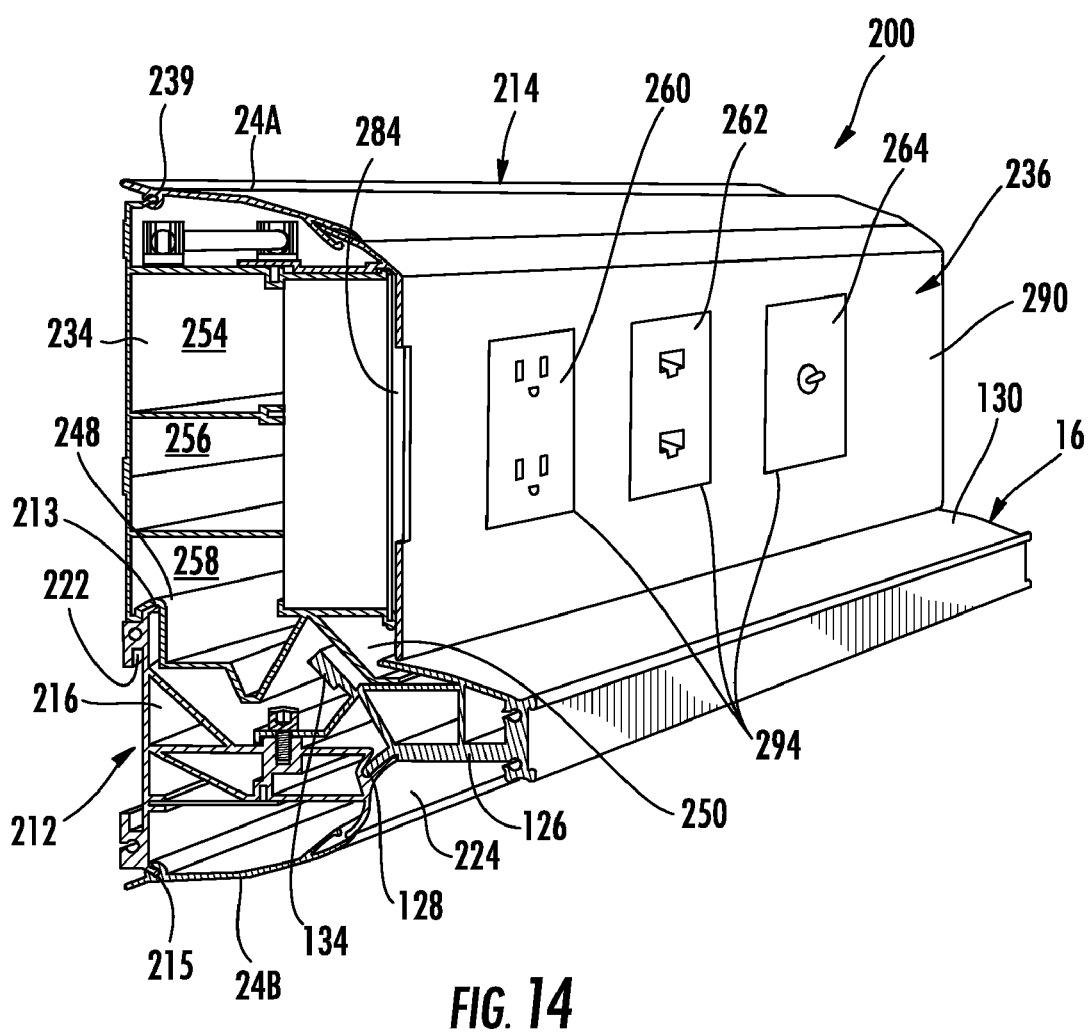
FIG. 14 is a perspective view thereof.
Figure 21:
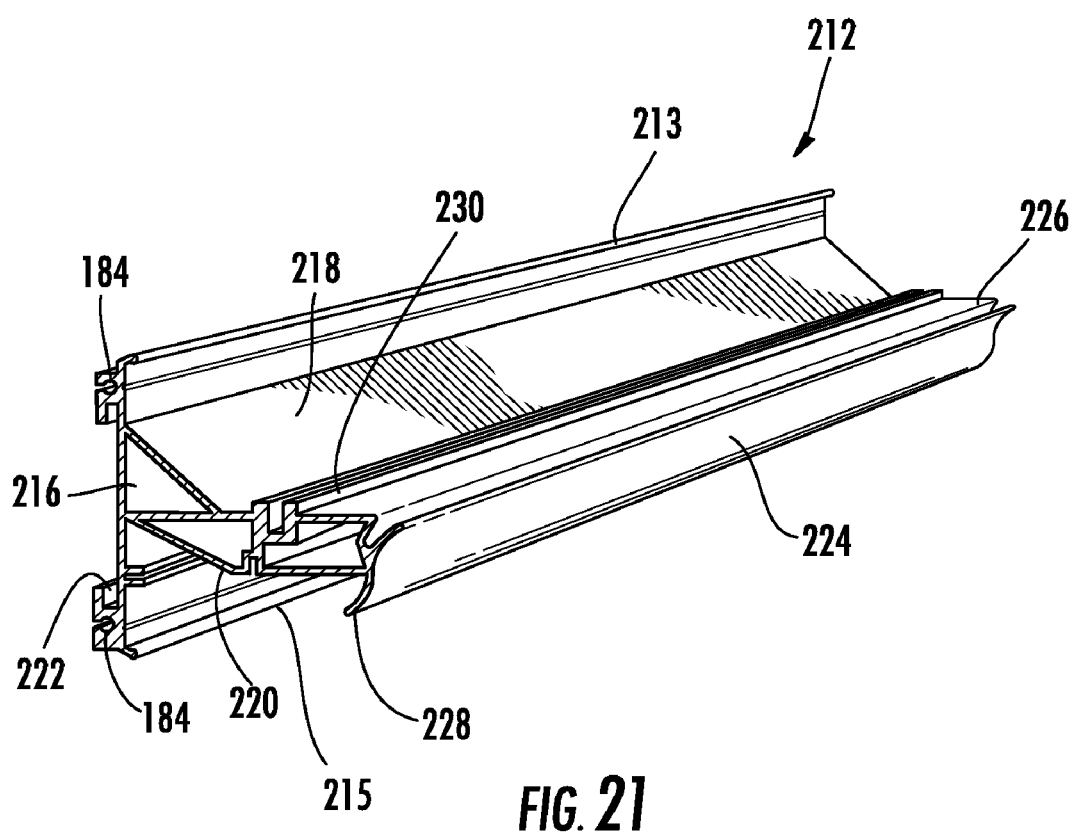
FIG. 21 is a perspective view of a modified mounting bracket for the power and equipment management assembly.
Figure 22:
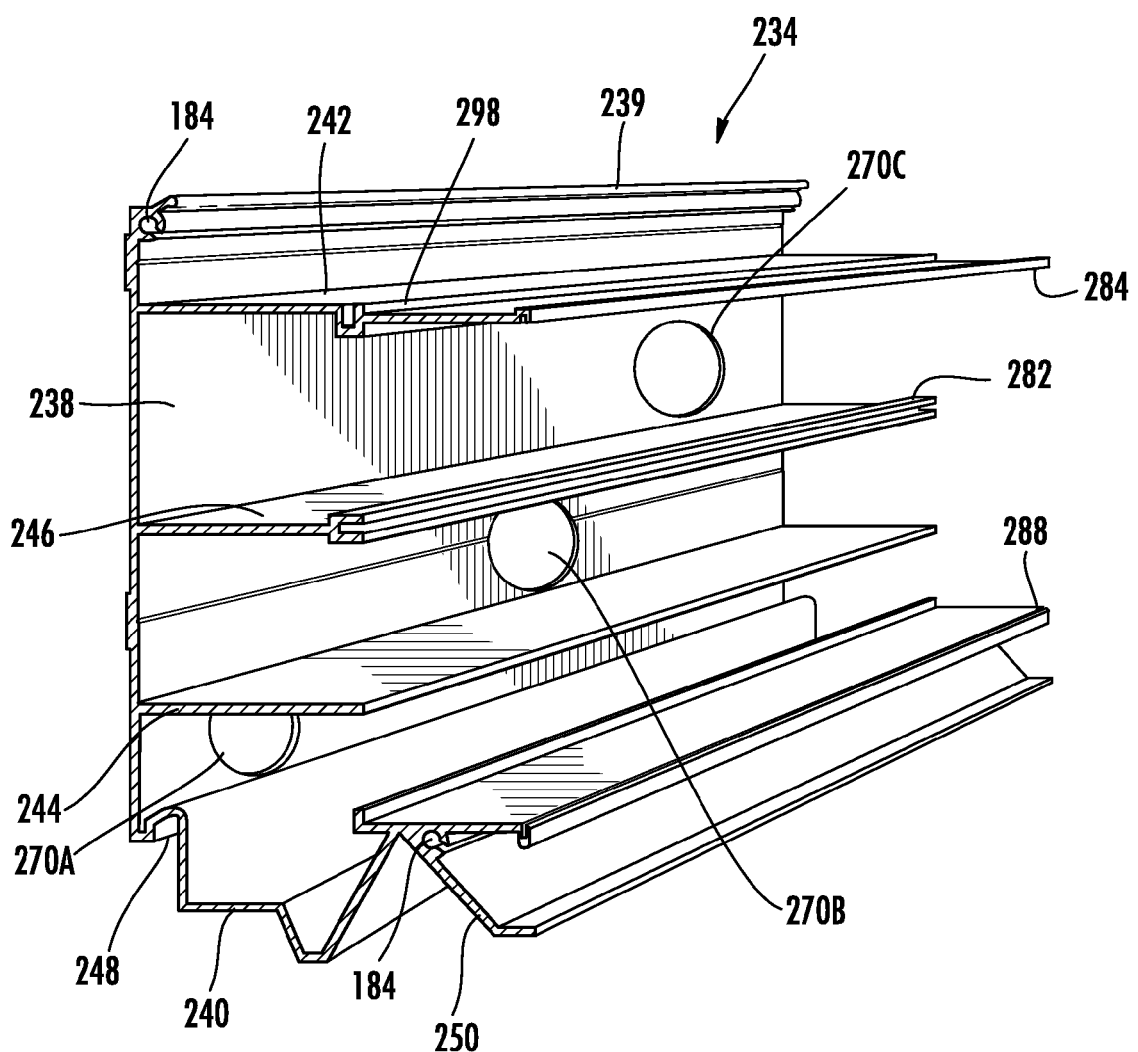
FIG. 22 is a perspective view of the back wall panel of the power distribution assembly.

Referring to FIGS. 13, 14 and 21, the modified mounting bracket 212 comprises a vertically oriented, longitudinally extending wall mounting flange 216, an upper supporting flange 218 and a lower supporting flange 220. The wall mounting flange 216 is configured and arranged to be secured to a vertically oriented wall structure 36 with threaded mounting screws or bolts 38, and further includes an upper hinge fulcrum 213 and lower hinge fulcrum 215. The wall mounting flange 216 further includes a channel structure 222 on the rear surface to accommodate a splicing plate 42, used to couple two side-by-side units together.

The upper and lower mounting flanges 218, 220 merge at their forward edges to define a contoured front facing surface 224 having an upper edge and a lower edge. The upper edge of the contoured surface 224 includes an elongated mounting channel 226, configured and arranged to receive the supporting tongue 128 formed on the equipment management rail 16. The lower edge of the contoured surface 224 is configured with a rounded corner 228.

The equipment management rail 16 is received and secured in mounted relation onto the modified mounting bracket 212 by inserting the supporting tongue 128 into the complementary mounting channel 226, and securing the primary mounting flange 132 to a complementary mounting boss 230 also formed on the upper supporting flange 218 of the mounting bracket 212 with a threaded fastener 232. In the power and equipment configuration as shown in FIGS. 13-23, the secondary power distribution mounting flange 134 will be utilized to secure the power distribution panel.

When the supporting tongue 128 is received into the complementary mounting channel 226 in the modified mounting bracket 212, the contoured outer surface of the lower wall 126 of the equipment management rail 16 merges together with the contoured outer surface 224 of the mounting bracket 212 to form a substantially continuous outer contoured surface.

The power distribution assembly 214 comprises a back wall panel generally indicated at 234, a power distribution face plate generally indicated at 236, and a plurality of partitioning panels to be described in detail hereinbelow.

The back wall panel 234 comprises a longitudinally extending mounting wall 238 with an upper hinge fulcrum 239, a lower wall 240, an upper wall 242, a lower dividing wall 244, and an upper dividing wall 246. A mounting lip 248 is formed at the junction between the mounting wall 238 and lower wall 240 wherein the mounting lip 248 is received in mated relation with the upper hinge fulcrum 213 (shown in FIG. 9) of the modified wall mounting bracket 212 to seat the back wall panel 234 on top of the modified mounting bracket 212. The mounting wall 238 is configured and arranged to be secured to a vertically oriented wall structure 36 with threaded mounting screws or bolts 38. The lower wall 240 including a downwardly angled mounting flange 250, which is secured to the secondary mounting flange 134 on the equipment management rail 16 by a threaded fastener 252.

Still referring to FIG. 13, the four walls 240, 242, 244, 246 of the back wall panel 234 extend in generally parallel relation and cooperate to define three (3) separate power conduits 254, 256, 258 for supplying different types of power and electrical signals along the length of the power distribution assembly. For purposes of the current disclosure, we will identify the conduits as Emergency Power (110 or 220 VAC) 254, Normal Power (not backed-up) 256, and Low Voltage (signal, data, nurse call, etc,) 258, which will ultimately be terminated in conventional wall receptacles, such as electrical receptacles 260, telephone/data receptacles 262 and cable receptacles (See FIG. 14) 264. Wiring supplying each type of power to the power distribution assembly is first routed into well-known wiring boxes 266 (only one shown) installed in a support structure. Knockouts or openings 270A, 270B and 270C (FIG. 22) in the mounting wall 238, are positioned in alignment with the knock-outs in the covers of the respective wiring boxes 266. The knock-outs 270A, 270B and 270C are positioned so that each wiring box is in communication with only one of the power channels 254, 256, 258, permit routing of each type of power to the appropriate wiring compartment under strict separation. Referring back to FIG. 13, wiring 268 into the assembly is generally provided through knockouts 270A, 270B and 270C in the rear of the wall panel 234. Wiring 268 of each power type enters the appropriate conduit 254, 256 258 of the assembly where it runs along the length of the respective power conduit 264, 256 or 258 while maintaining separation for further termination within individual compartments 271 as seen in FIGS. 15-17.

Figure 15:
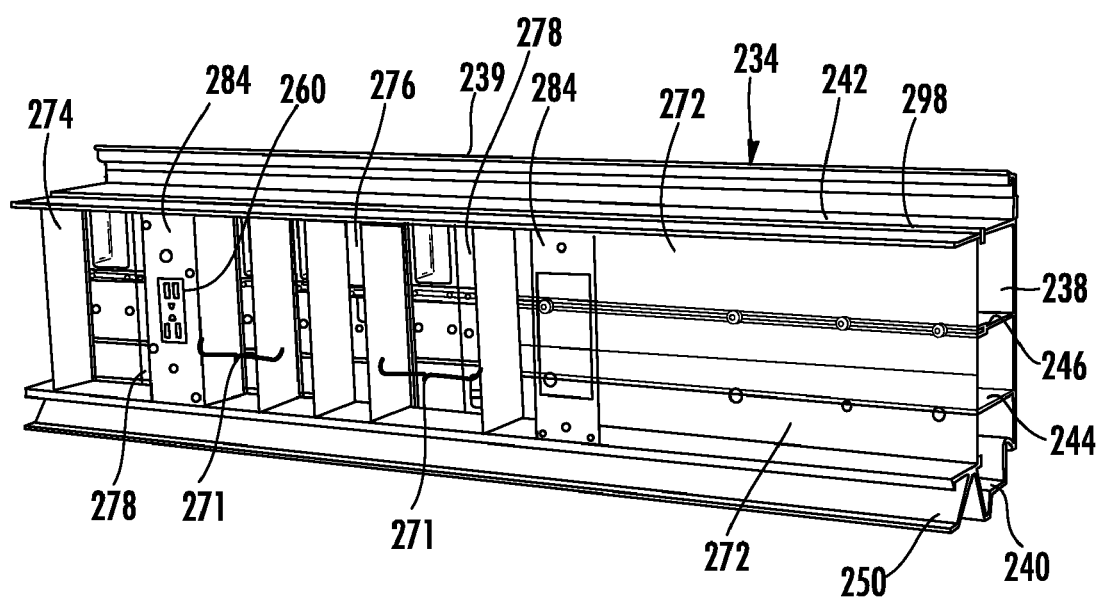
FIG. 15 is a perspective view of just the power distribution assembly showing configurations of the internal partitions.
Figure 16:
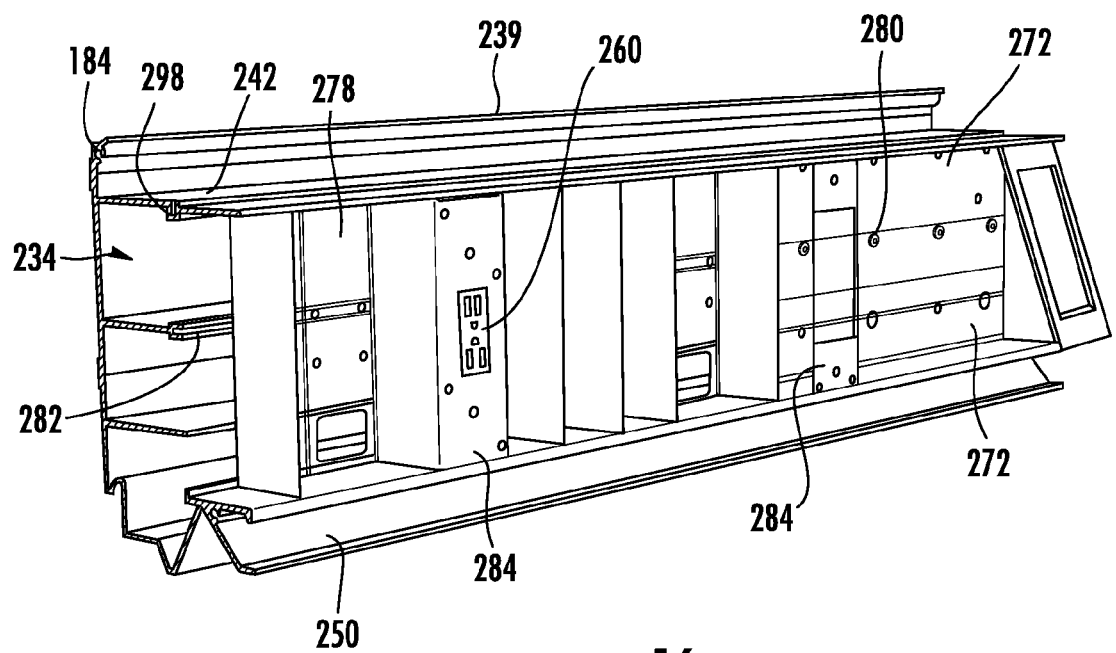
FIG. 16 is another perspective view thereof.
Figure 17:
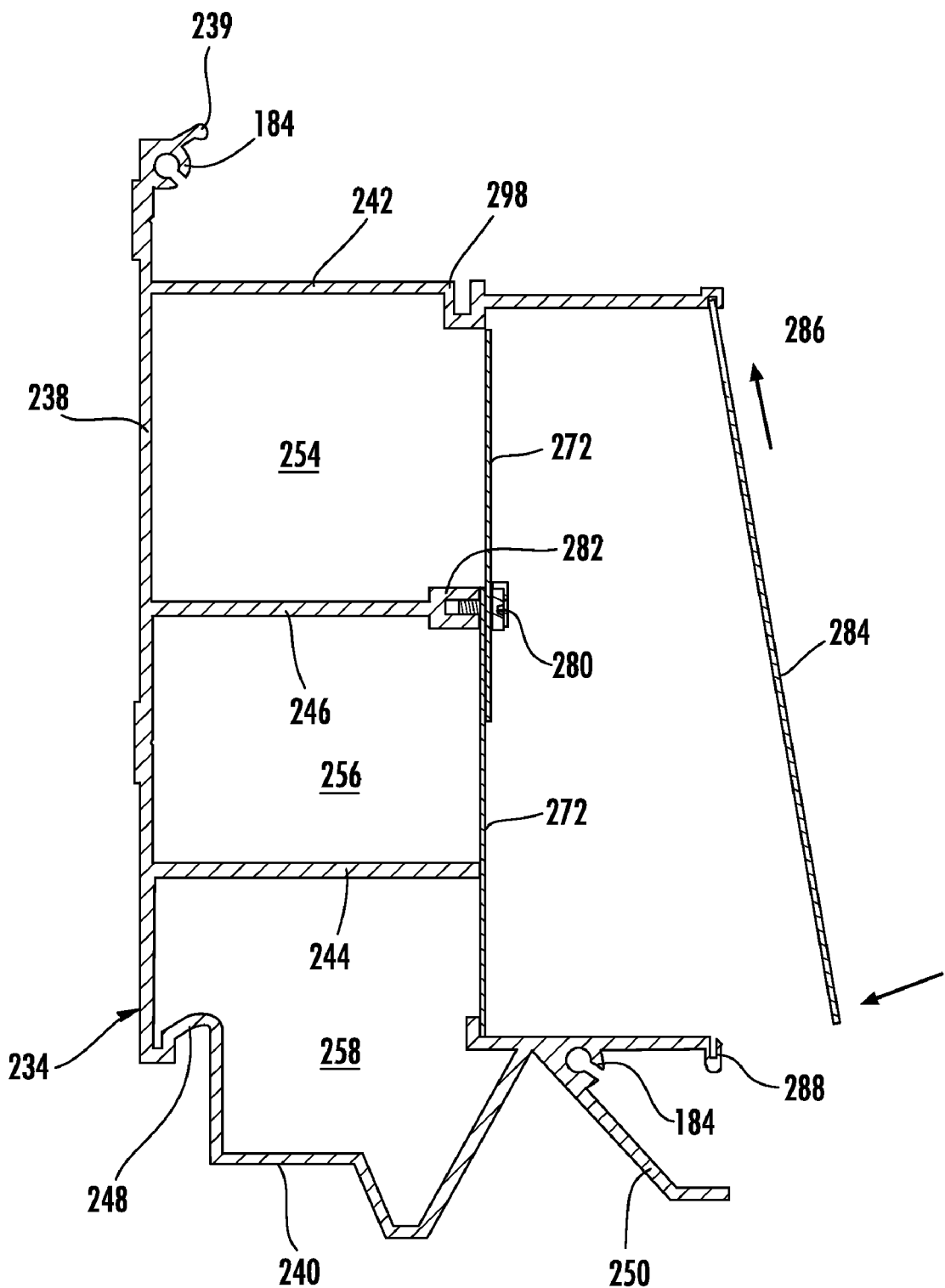
FIG. 17 is a end view thereof.
Figure 18:
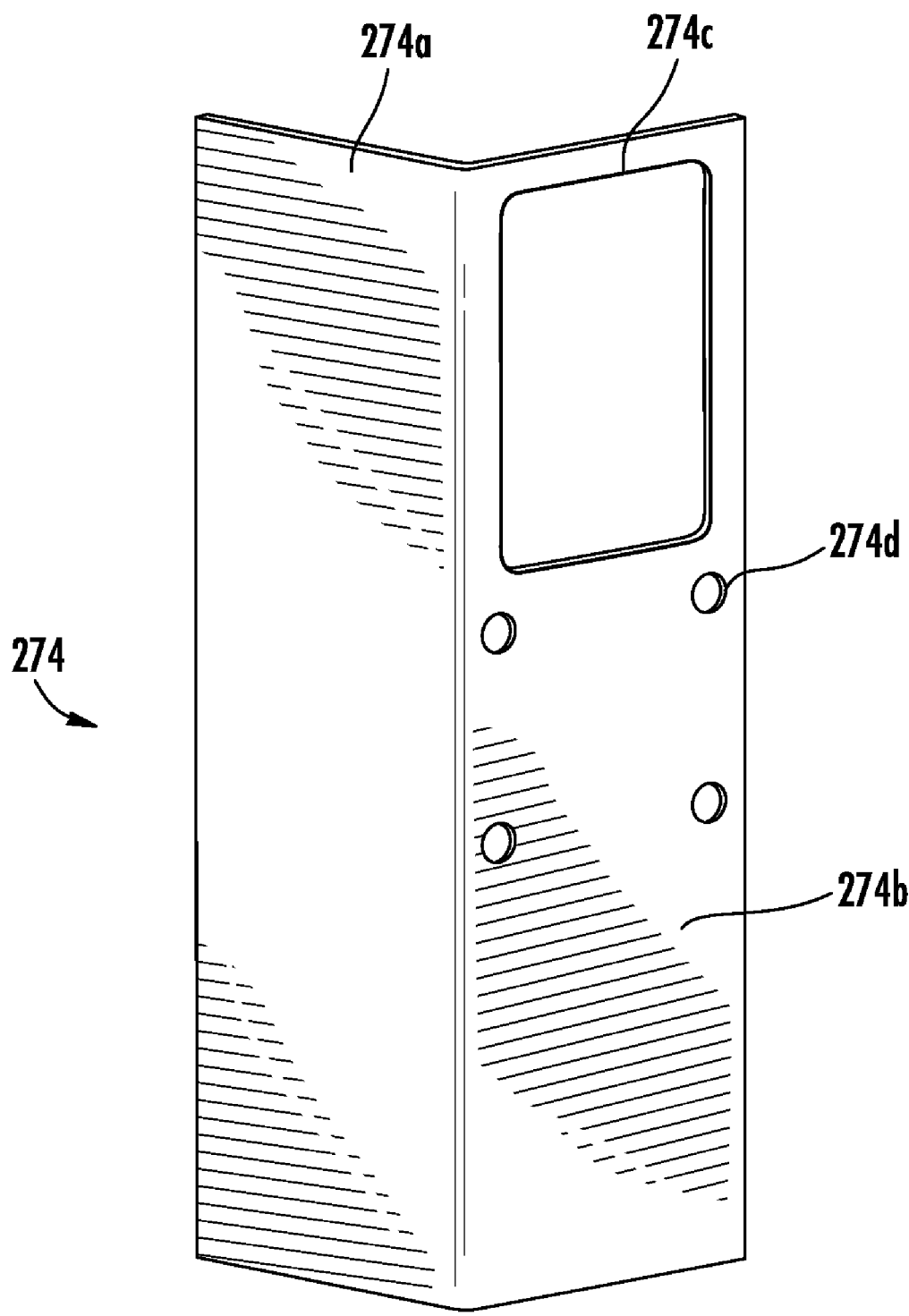
FIGS. 18A and 18B are perspective views of a single-gang partition with a bottom opening.
Figure 19:
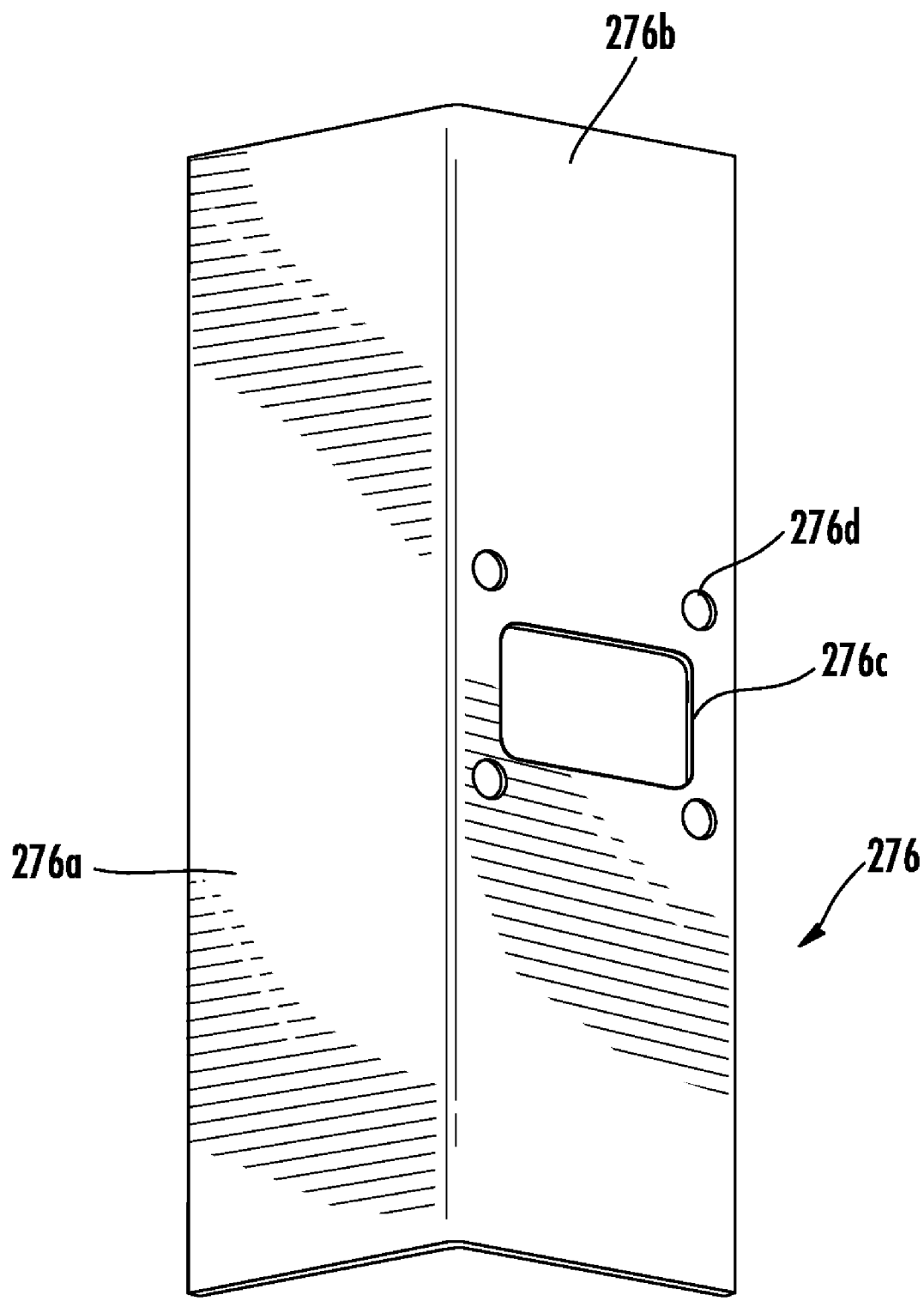
FIG. 19 is a perspective view of a single-gang partition with a middle opening.
Figure 20:
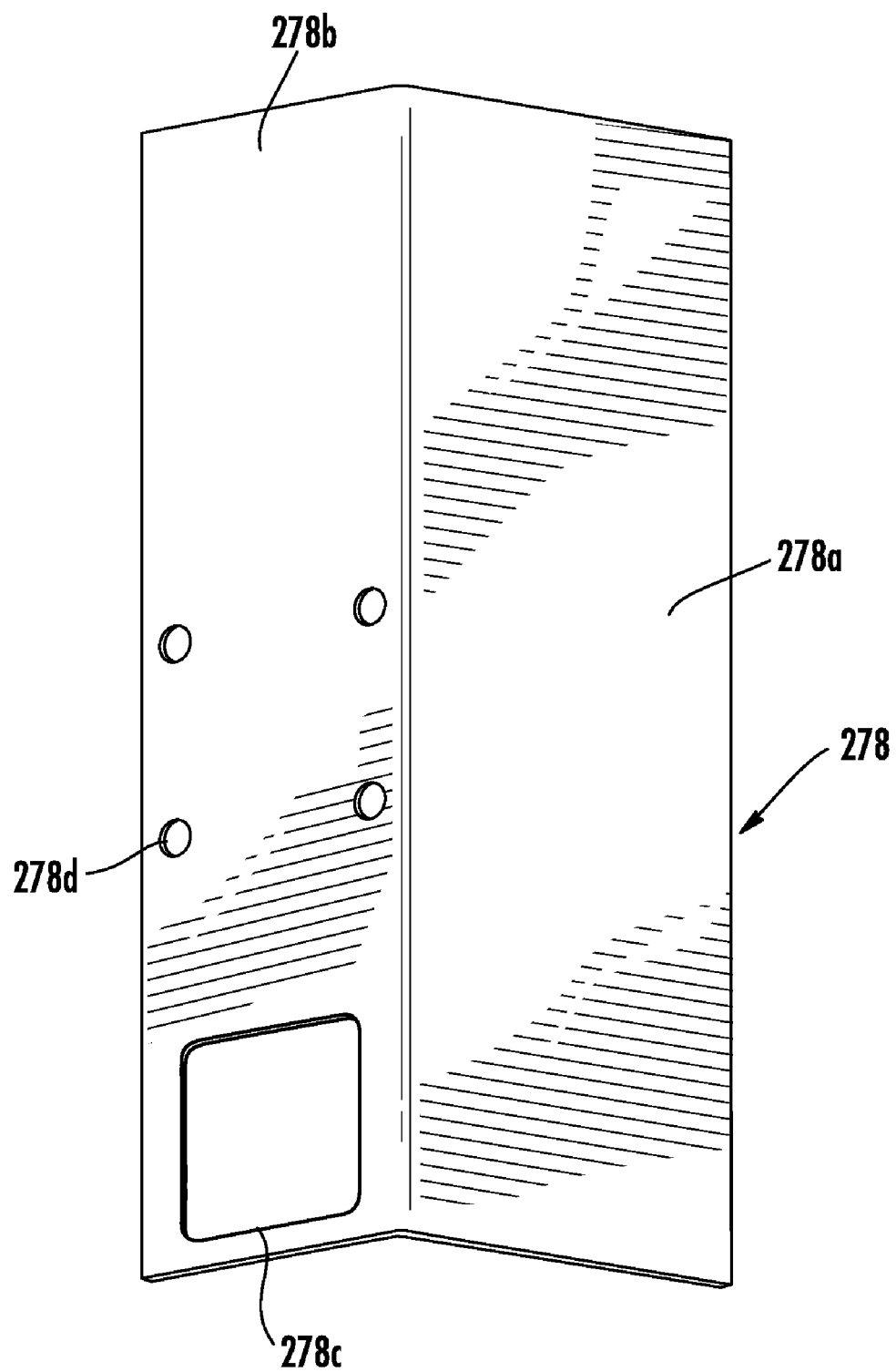
FIG. 20 is a perspective view of a single-gang partition with a top opening (shown inverted)

Referring to FIGS. 15-17, the portions of the wiring conduits that don't feed specific wiring devices are enclosed with flat access plates 272 to maintain separation between the different power types. Generally, the fluorescent lighting ballasts may be located within one of the wiring channel behind these plates 272, with the plates 272 removable for access and repair of the ballast, or the fluorescent lighting ballasts may be mounted to the front of the plates 272 for easy service access after removing the face plate 236. The portions of the wiring conduits that feed specific wiring devices are enclosed with a plurality of individual receptacle partitions 274, 276, 278, each having a side wall 274a, 276a, 278a, and a rear wall 274b, 276b, 278b with either a bottom opening 278c (FIG. 20), middle opening 276c (FIG. 19) or top opening 274c (FIG. 18) for routing wiring from the respective conduit into the respective compartment 271. These partitions are secured to the upper dividing wall 246 with fasteners 280 that are received through openings 274d, 276d and 278d, and into a mounting channel 282 on the terminal end of the upper dividing wall 246 (FIG. 17). Any two adjoining partitions, in cooperation with the lower wall 240, the mounting lip 248 and a receptacle plate 284, will form a fully enclosed wiring compartment. The "tips" of the partitions 244, 246 align with the ledges of the partitions 240 and 242 so that panels 272 and rear walls 274b, 276b, and 278b of partitions 274, 276, 278 will be supported so as to complete the separation of the power conduits.

Still referring to FIG. 17, individual receptacle plates 284 are thereafter seated over the partitions by inserting an upper edge thereof into a deep channel 286 on the end of the upper wall 242 and dropping the lower edge into a shallower channel 288 on the end of the lower wall 240. These receptacle plates 284 are optional, as the receptacles 260, 262, 264 can be directly mounted to the rear surface of the face plate 236. Respective wiring 268 within each of the partitions is then terminated on the desired receptacles, 260, 262, 264 and then the receptacles secured to the receptacle plates 284. Thus, when removing the face plate 236 during service and repair, no live wiring will be exposed.

Figure 23:
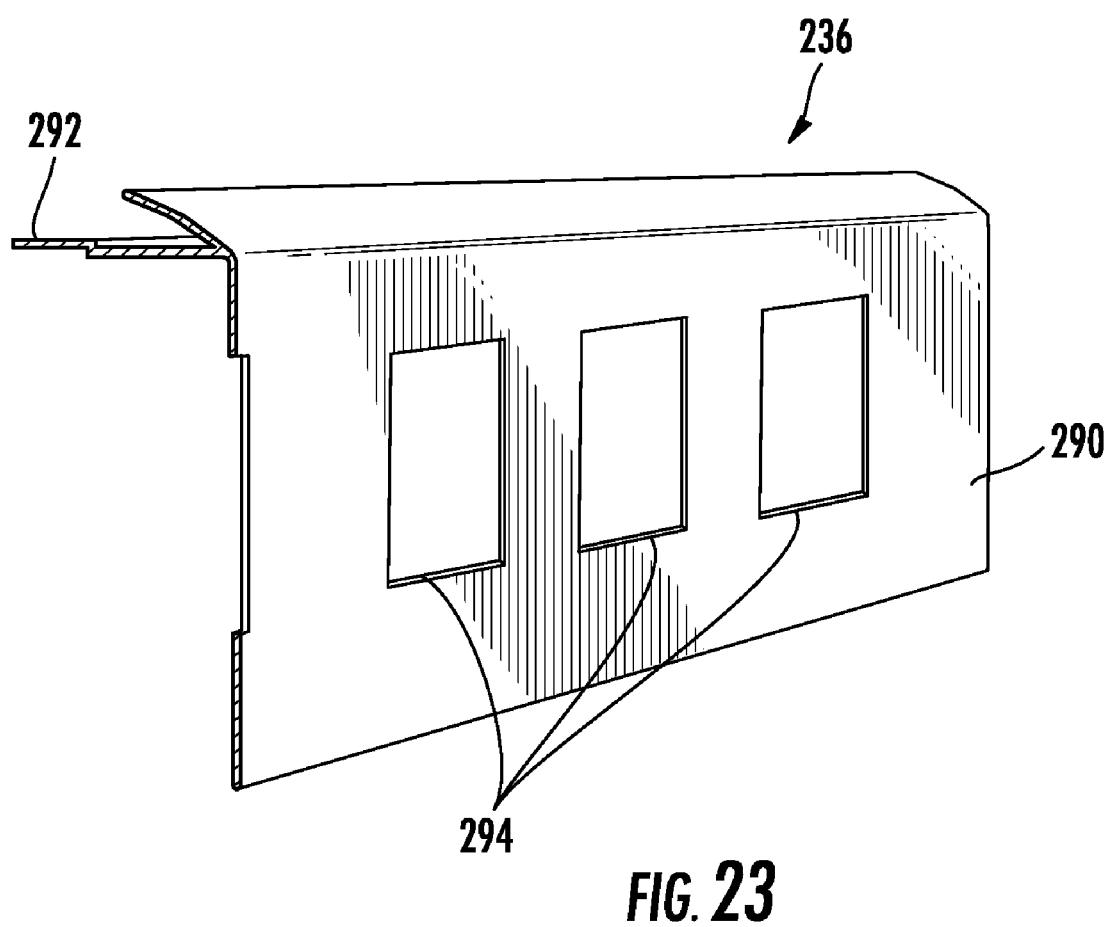
FIG. 23 is a perspective view of the power distribution face plate.

Referring to FIGS. 13 and 23, the power distribution face plate 236 comprises a front face panel 290, and a rearwardly extending mounting wall 292. The front face panel 290 has a contoured surface with a plurality of openings 294 (FIG. 23) for receiving the various receptacles 260, 262, 264 as mounted within the underlying power distribution assembly. The power distribution face plate 236 is secured to upper wall 242 with fasteners 296 that are received into a mounting channel 298 formed in the upper surface of the upper wall 242. The lower edge of the front face panel 290 is received in adjacent relation with the upper contoured wall 130 of the equipment management rail 16. An optional gasket 297 closes the gap between face plate 236 and equipment rail 16.

An upper fluorescent lighting component 18 is mounted on top of the upper wall 242 so that it is adjacent the upper edge of the back wall panel 234, while a lower fluorescent lighting component 20 is mounted under the lower supporting flange 220 so that it is adjacent the lower end of the mounting flange 216. Ballasts (not shown) for the fluorescent lighting fixtures 18, 20 can be mounted at various locations on the supporting flanges as appropriate. The placement of the lighting components 18, 20 at the upper and lower edges of the mounting flange provides a superior location for both uplighting and downlighting of the supporting wall structure 36.

Mounted over the lighting components 18, 20 are lens panels 24A, 24B. In this embodiment, the upper lens panel 24A and the lower lens panel 24B are the same, being the lower lens panel 24 as previously described hereinabove. The lens panels 24 have a rear edge and a front edge with a contoured surface extending between the two edges. The rear edges of both panels includes a hinge channel 148 which is snap received over complementary hinge fulcrums 239 and 215 respectively formed on the upper and lower edge of the wall mounting flanges. The front edge of both lens panels 24A, 24B include an opposing clip 158 that is snap received over the lip formed on the rearwardly extending edge of the front panel 290 of the power distribution face plate 236 and the rounded wall of the mounting bracket 228. The lens panels 24A, 24B are pivotably movable on the hinge fulcrums 239, 215 to provide access to the fluorescent bulbs therein for repair and/or replacement. The outer surfaces of lens panels 24A, 24B, equipment management rail 16 and mounting bracket 212 effectively merge together at their transition edges to provide continuous outer surface contours that are both aesthetically pleasing and easy to clean and sanitize.

Figure 24:
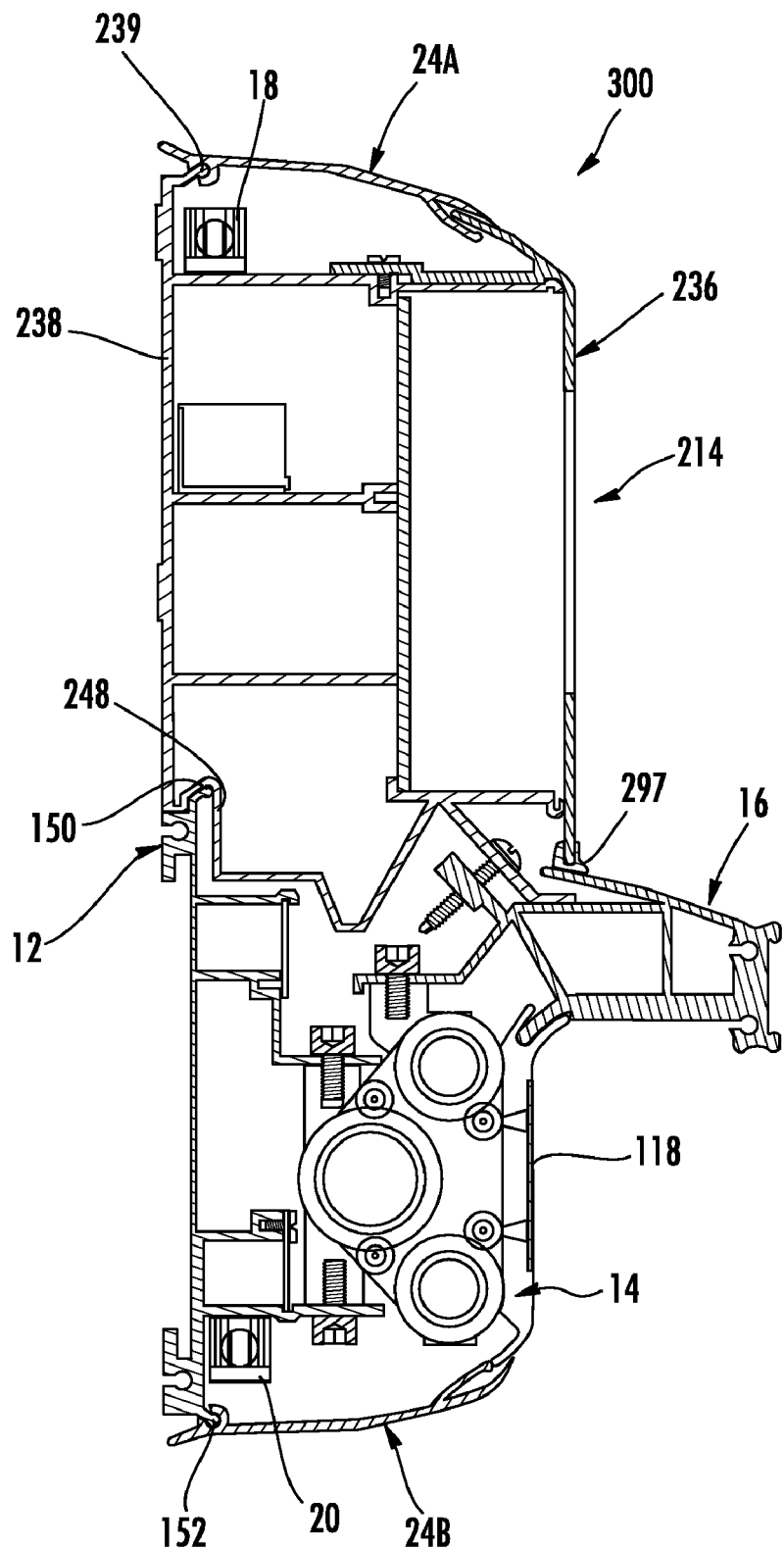
FIG. 24 is an end view of a component-based fluid, power and equipment management assembly in accordance with the teachings of the present invention.
Figure 25:
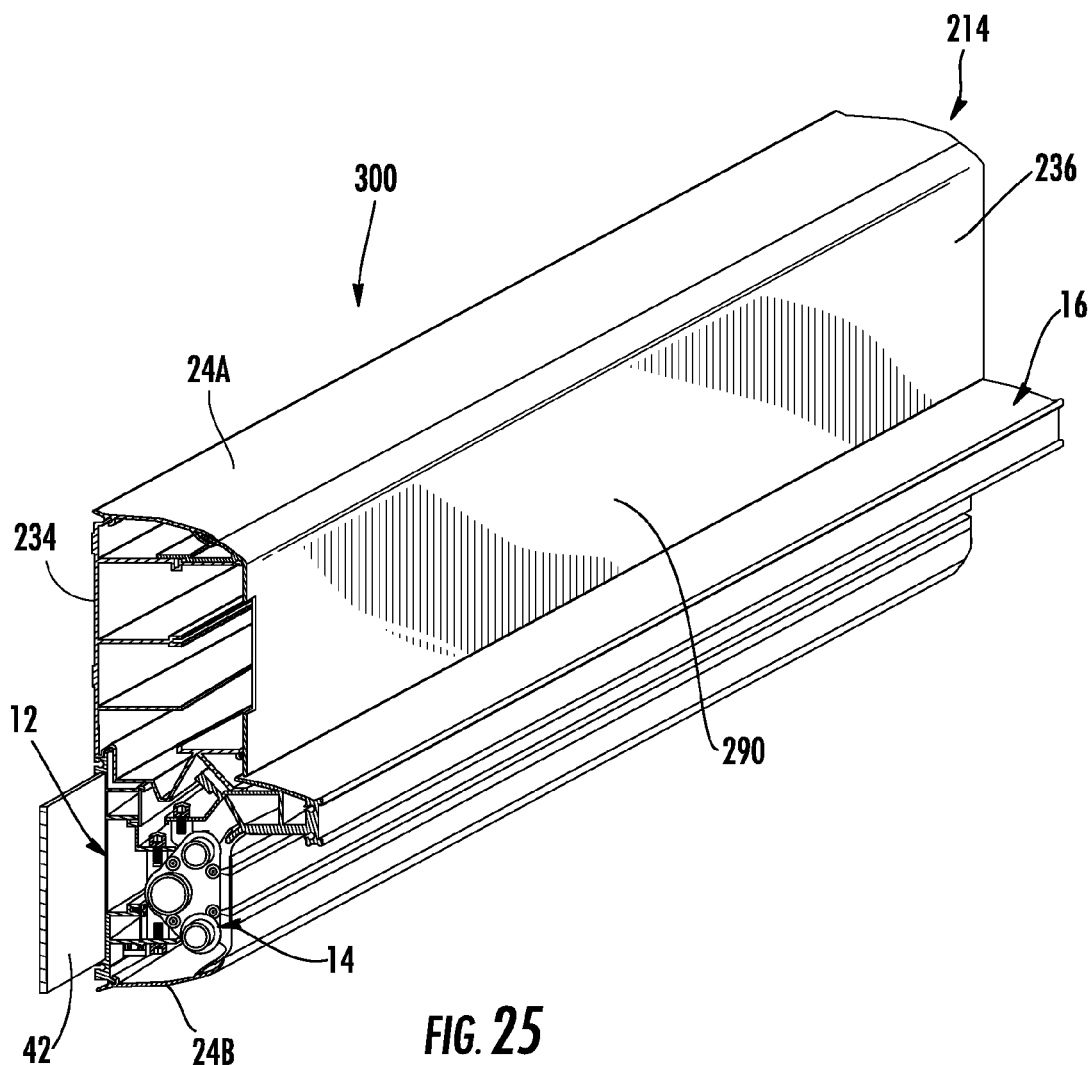
FIG. 25 is a perspective view thereof.

Referring to FIGS. 24 and 25, a combined fluid, power and equipment management configuration is illustrated and generally indicated at 300. This configuration 300 comprises a standard mounting bracket 12 as described hereinabove with respect to the fluid and equipment management configuration 10, a fluid manifold 14 mounted to the mounting bracket 12, an equipment management rail 16 mounted to the fluid manifold 14, and a power distribution assembly 214 mounted to the mounting bracket 12 and the equipment management rail 16, all components being as described hereinabove.

Figure 26:
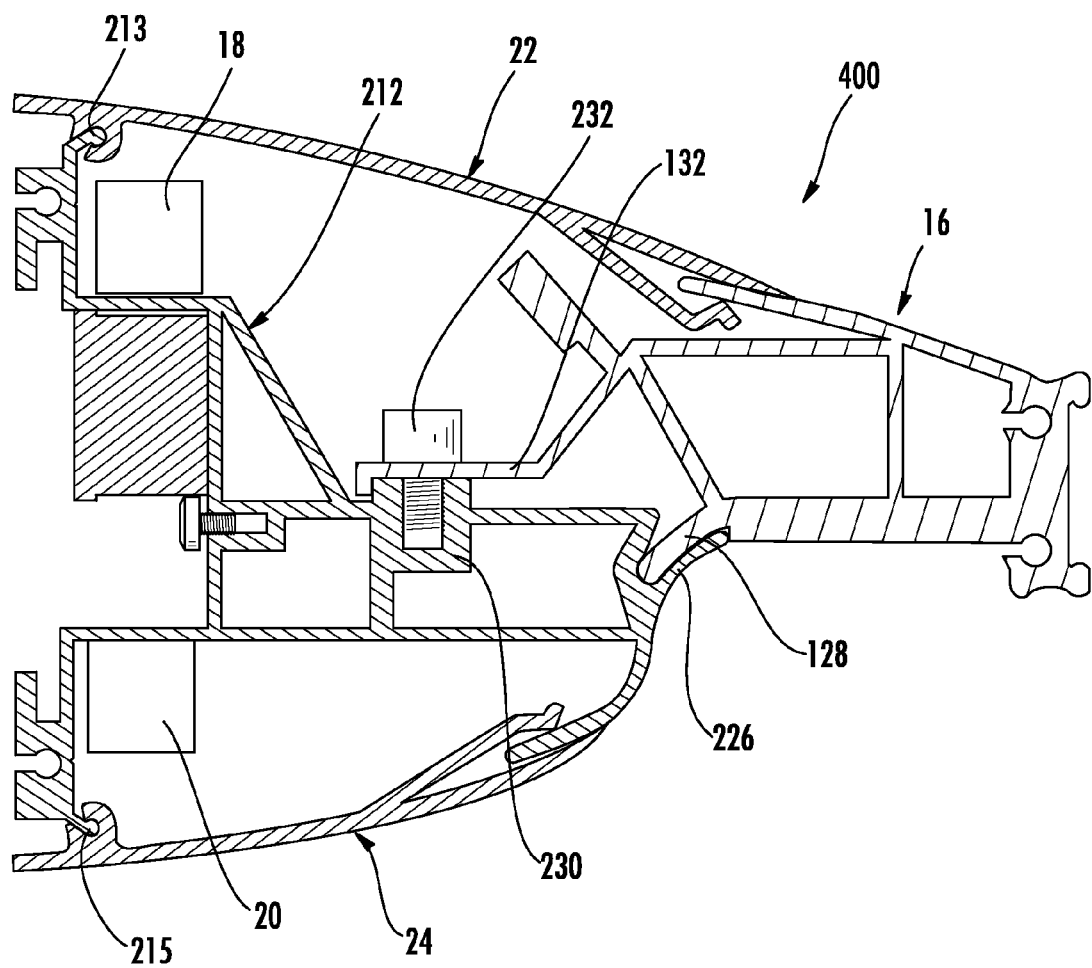
FIG. 26 is an end view of a component-based equipment management assembly in accordance with the teachings of the present invention.

Referring to FIG. 26, a stand-alone equipment management configuration is illustrated and generally indicated at 400. This configuration 400 comprises the modified mounting bracket 212 as described hereinabove with respect to the power and equipment management configuration 10, and an equipment management rail 16 mounted to the mounting bracket 212.

Turning now to FIGS. 27-31, an alternate embodiment fluid, power and equipment management rail configuration is illustrated and generally indicated at 500. The fluid, power and equipment configuration comprises a modified wall mounting bracket generally indicated at 512, a fluid manifold indicated at 514, an equipment rail generally indicated at 516, a power distribution assembly generally indicated at 518, lighting components as described above at 18, 20 and lighting lens panels 24A, 24B.

The equipment rail 516 is substantially identical to the equipment rail 16 described hereinabove, the fluid manifold 514 is substantially identical to the fluid manifold indicated at 14 above and the power distribution assembly 518 is substantially identical to the power distribution assembly described and therefore these components will not be described in detail with respect to the current configuration.

Figure 27:
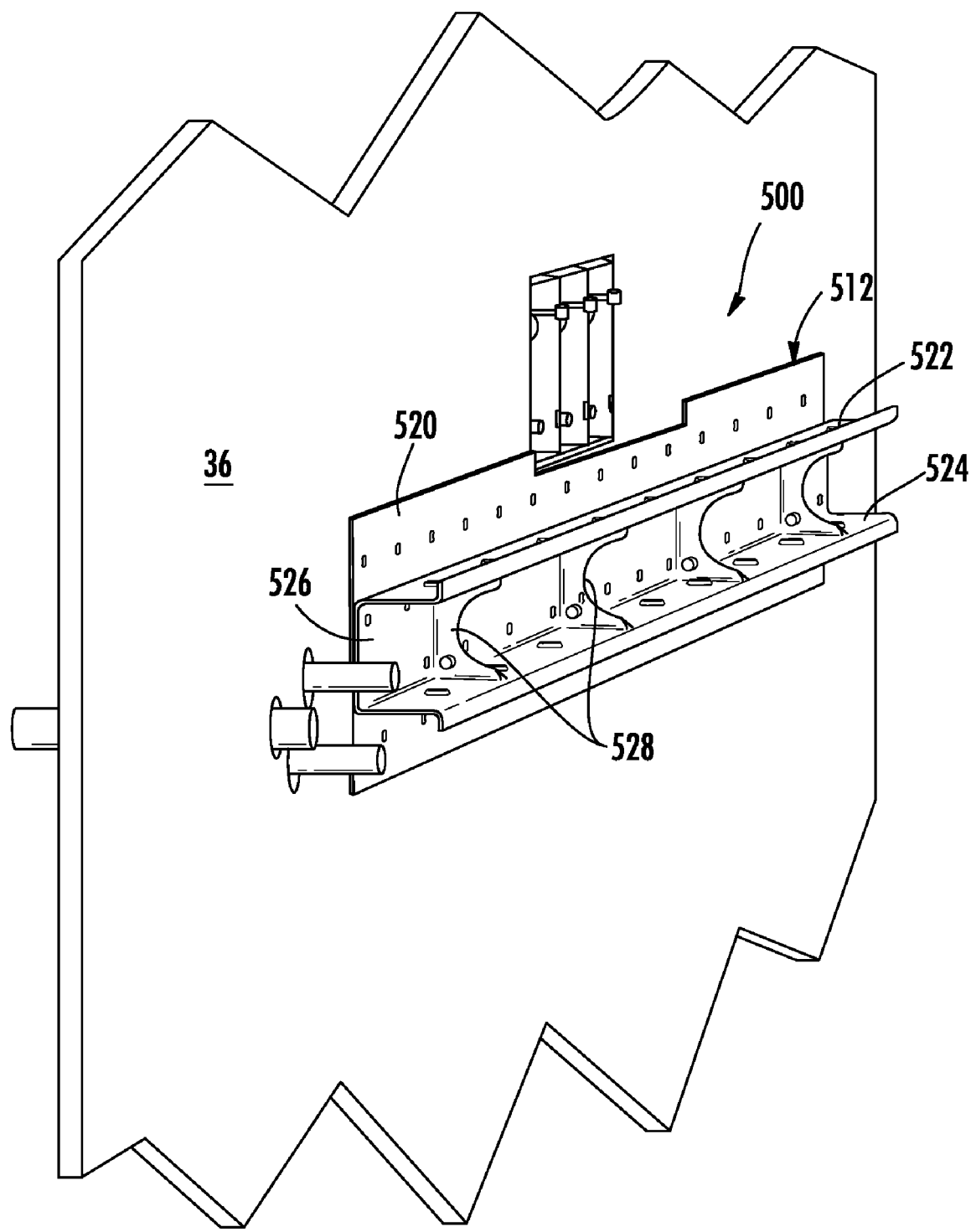
FIG. 27 is a perspective view of an alternate embodiment mounting bracket.
Figure 28:
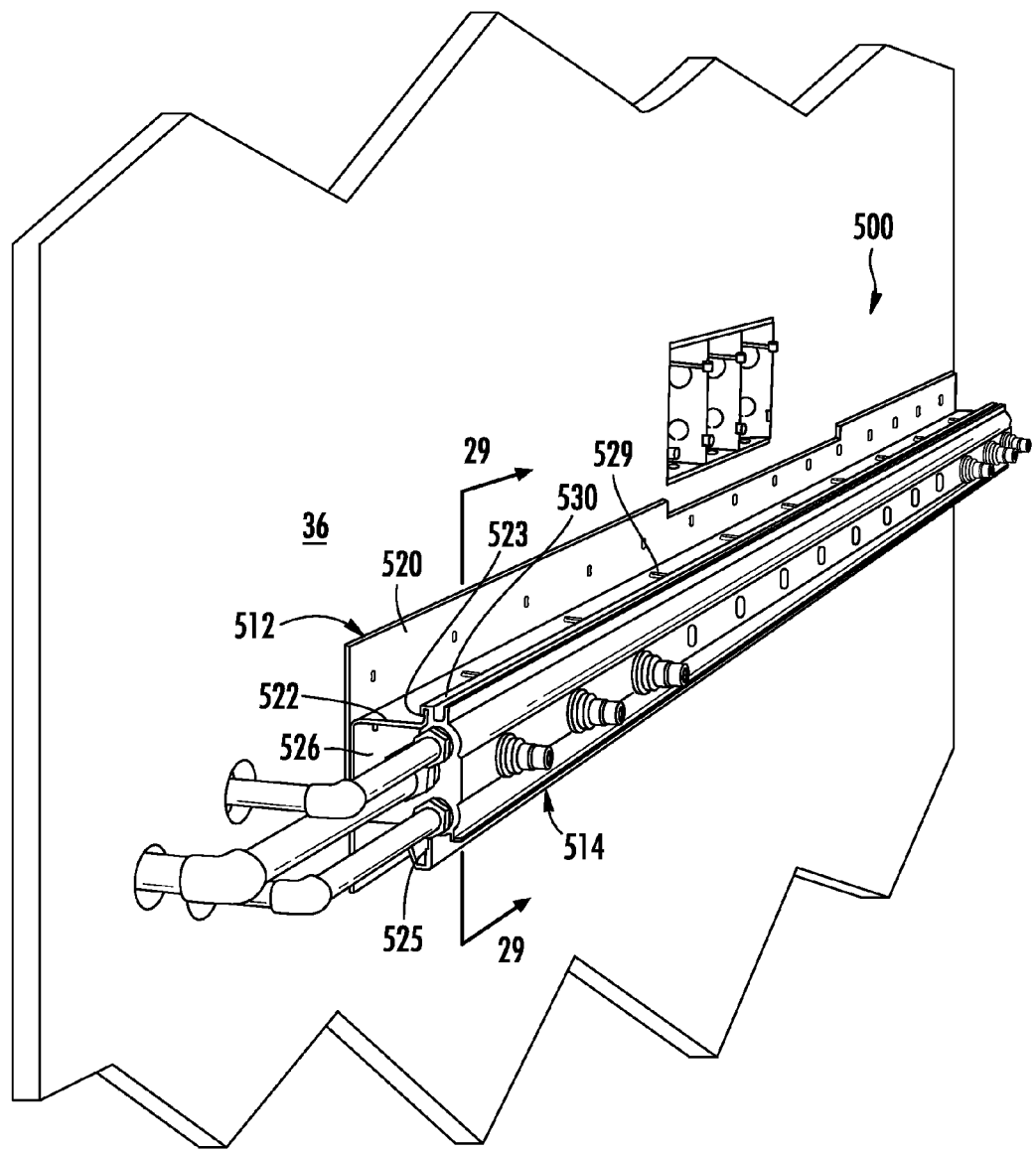
FIG. 28 is a perspective view thereof with the fluid manifold received thereon.
Figure 29:
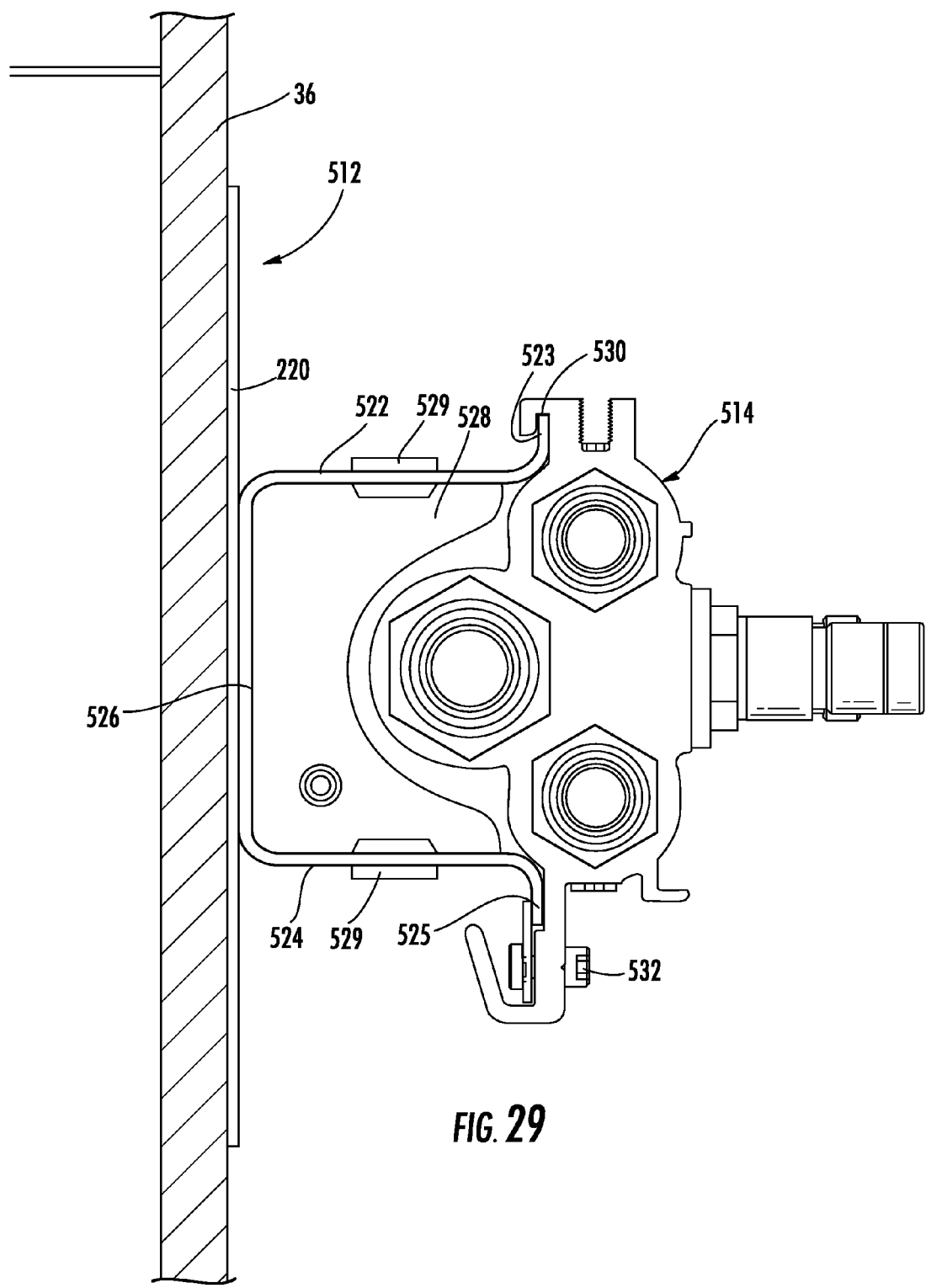
FIG. 29 is a cross-sectional view taken along line 29-29 of FIG. 28.

Referring to FIGS. 27-29, the modified mounting bracket 512 of the present alternate embodiment comprises a vertically oriented, longitudinally extending wall mounting flange 520, an upper supporting flange 522 and a lower supporting flange 524. It is preferred that the upper supporting flange 522 and the lower supporting flange 524 are connected to one another along a rear edge thereof by a rear wall 526. In this manner, the rear wall 526 extends between the rear edge of the upper supporting flange 522 and the lower supporting flange 524 such that the three components form a U-shaped profile. Further, the rear wall 526 is affixed to the wall mounting flange 520 such that the upper supporting flange 522 and lower supporting flange 524 extend outwardly from the mounting bracket 512. It should also be appreciated that the mounting bracket 512 as described may be formed as a one-piece extrusion. Stiffener ribs 528 may also be provided that extend in a substantially perpendicular plane and are affixed to the rear wall 526, the upper supporting flange 522 and the lower supporting flange 524 to enhance the rigidity of the U-shaped profile of the mounting bracket. Further, grommets 529 can be seen as being provided in the upper supporting flange 522 and the lower supporting flange 524 to allow wiring access therethrough. The entire mounting bracket 512 is installed wherein the wall mounting flange 520 is configured and arranged to be secured to a vertically oriented wall structure 36 with threaded mounting screws, wall anchors or bolts as described above.

As can best be seen in FIGS. 28 and 29, the upper supporting flange 522 includes an upwardly extending lip 523 on an outer edge thereof and said lower supporting flange 524 includes a downwardly extending lip 525 on an outer edge thereof. The fluid manifold 514 is received onto the mounting bracket 512 and supported by the upper supporting flange 522 and lower supporting flange 524. More specifically, the fluid manifold 514 is releasable engaged with the upper supporting flange 522 and lower supporting flange 524 such that a channel 530 formed on the rear surface of the fluid manifold 514 engages the lip 523 on the upper supporting flange 522. It can be further seen that fasteners 532 are installed along a bottom edge of the fluid manifold 514 to releasably secure the bottom edge of the fluid manifold to the lip 525 extending from the lower support flange 524. It should be appreciated that while such fastener 532 are depicted as clamps, the fasteners may also be secured directly into the lip 525 or the lower supporting flange 524.

Figure 30:
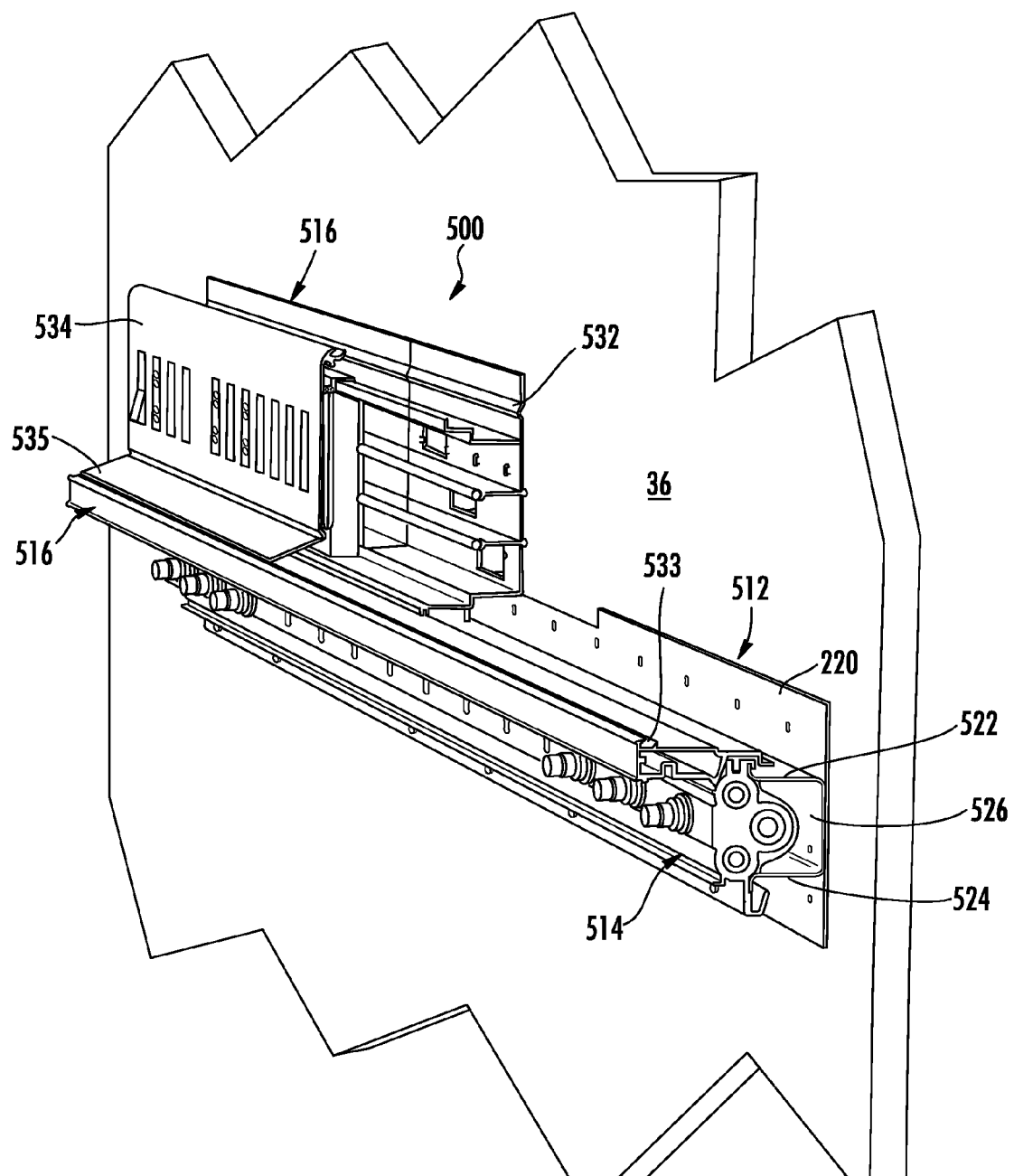
FIG. 30 is a perspective view of the alternative embodiment mounting bracket with the fluid manifold, equipment management rail and power assembly installed thereon.
Figure 31:
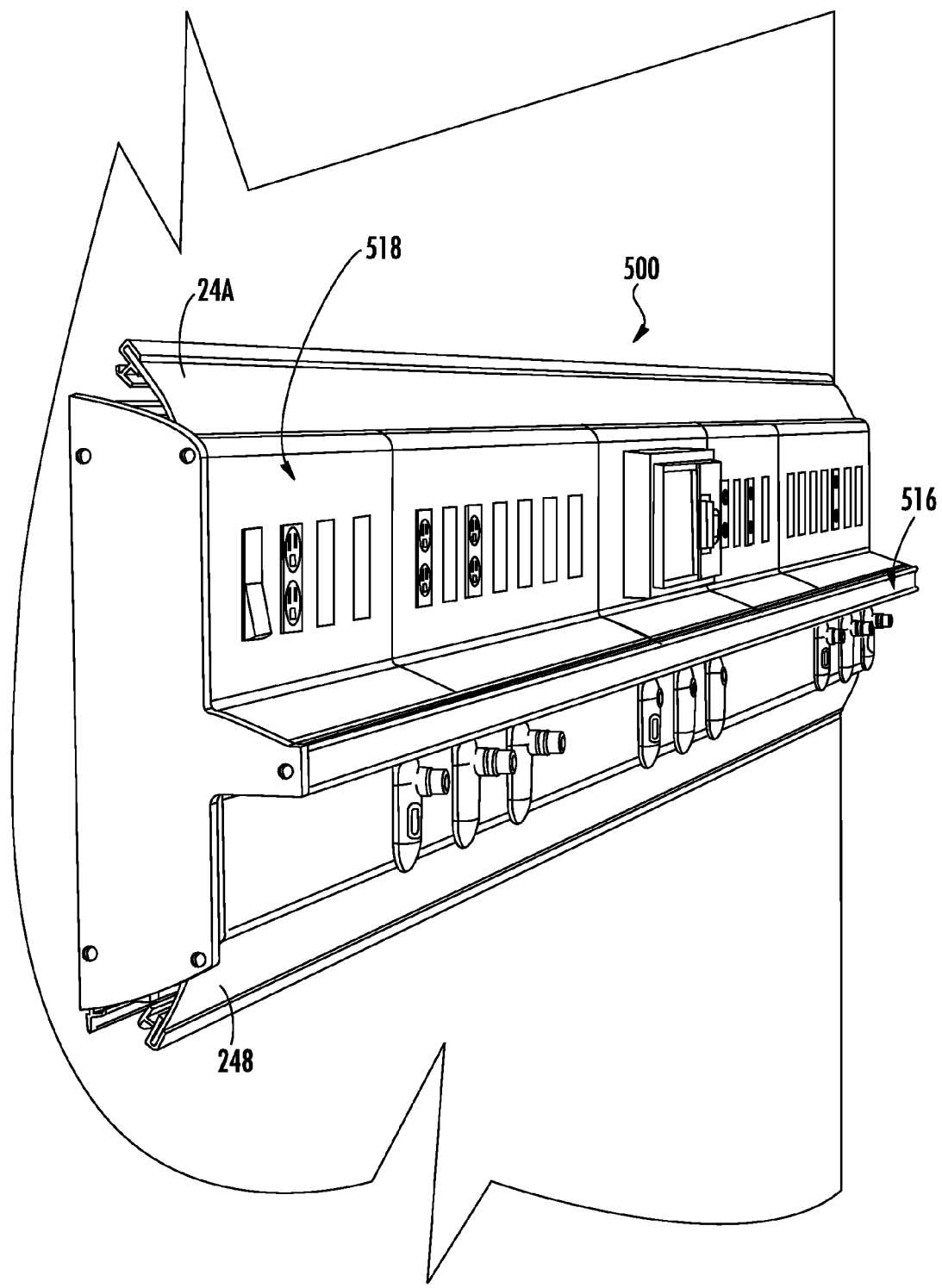
FIG. 31 is a perspective view of a completed installation of the alternate embodiment component-based system of the present invention.

Turning now to FIGS. 30 and 31, as was described in detail above with regard to the first embodiment, the equipment management rail 516 is received and secured in mounted relation with the assembly. In this embodiment, the equipment rail 516 is mounted onto the top of the fluid manifold 514, but alternately may be mounted to and supported by the modified mounting bracket 512. Should a power distribution assembly 518 be employed, a secondary power distribution mounting flange 532 will be utilized to secure the power distribution assembly 518 to the wall. It can also be seen that the top edge of the equipment management rail 516 includes a universal mounting channel 533 that allows the assembly to fit together in a modular fashion. Should a power distribution assembly 518 be employed, the lower edge of the fascia panel 535 is received and retained in the universal mounting channel 533 thereby forming an uninterrupted outer contour for the surface of the assembly. Conversely, if a power distribution assembly 518 is not employed, the universal mounting channel can receive a translucent lens panel 24A, 24B or a solid closure panel. In this manner is should be appreciated that the assembly of the present invention can be configured and reconfigured as desired.

As was the case in the earlier embodiments, when power distribution panel 534 is received in engaged relation with the equipment rail 516 that is in turn engaged with the fluid manifold 514, the contoured outer surfaces all merge together to form a substantially continuous outer contoured surface.

Figure 32:
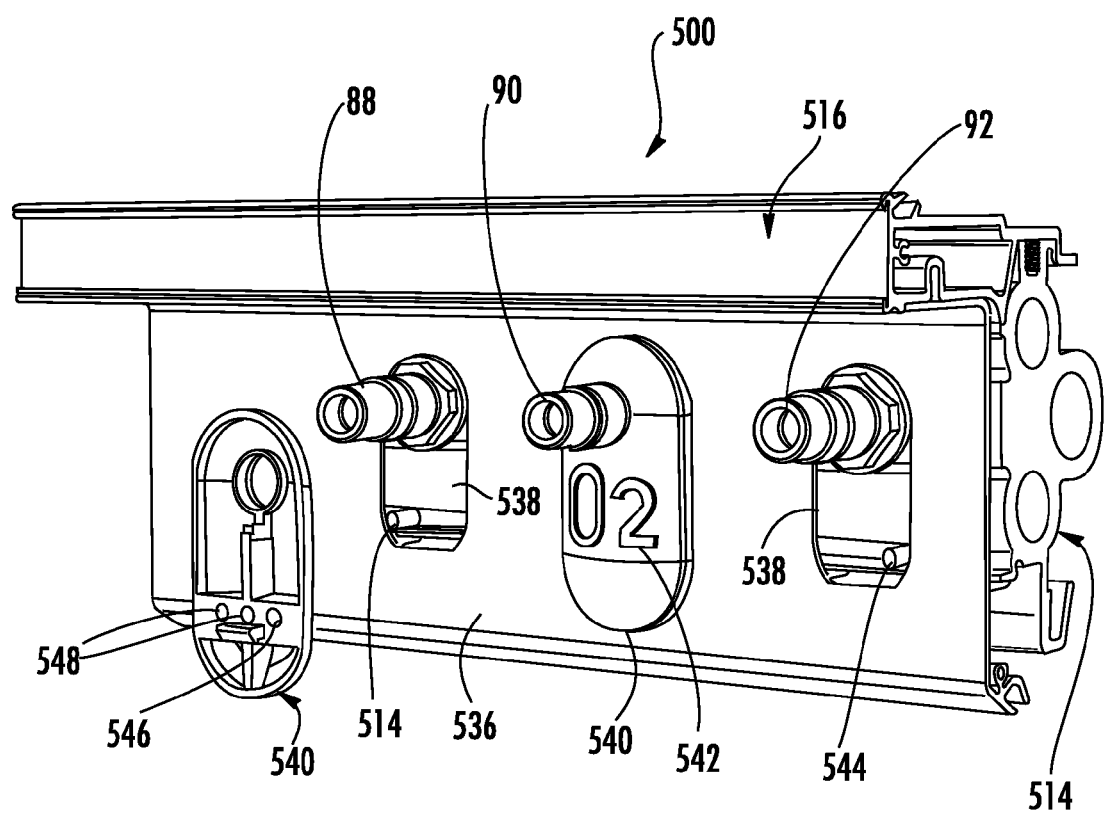
FIG. 32 is a perspective view of the fluid delivery outlets and escutcheon plates therefore.

FIG. 32 depicts a close detail view of the front face of the fluid manifold 514 wherein a decorative face cover plate 536 has been installed to cover the fluid manifold 514. The fluid outlets 88, 90, 92, and can be seen extending outwardly from the fluid manifold 514 through holes 538 in the face cover plate 536. Escutcheon plates 540 are provided that are configured to be installed around the fluid outlets 88, 90, 92 to close the hole 538 between the fluid outlets 88, 90, 92 and the face cover plate 536. As can be seen, the escutcheons 540 bear indicia 542 that serve to label the discrete purpose of each of the fluid outlets 88, 90, 92. To ensure that the proper escutcheon 540 bearing the correct label 542 is installed on the correct fluid outlet, the present invention includes index pins 544 that are positioned adjacent the fluid outlets 88, 90, 92 such that the index pins 544 also extend outwardly through the hole 538 in the face cover plate 536. The rear surface of the escutcheons 540 include one hole 546 therein in one of a plurality of different positions 548. In this manner, before an escutcheon 540 can be installed over a fluid outlet 88, 90, 92, the position of the hole 546 in the rear of the escutcheon 540 must match the location of the index pin 544 for that particular fluid outlet 88, 90, 92. For example, the vacuum may have an index pin 544 positioned to the left and therefore an escutcheon 540 bearing a vacuum label will have a hole 546 in the left position and therefore could only be installed over the vacuum outlet. Similarly, the oxygen index pin 544 may be in the center and the air index pin 544 may be on the right. In this manner, the escutcheons 540 cannot be swapped preventing mislabeling of the fluid outlets 88, 90, 92.

Figure 33:
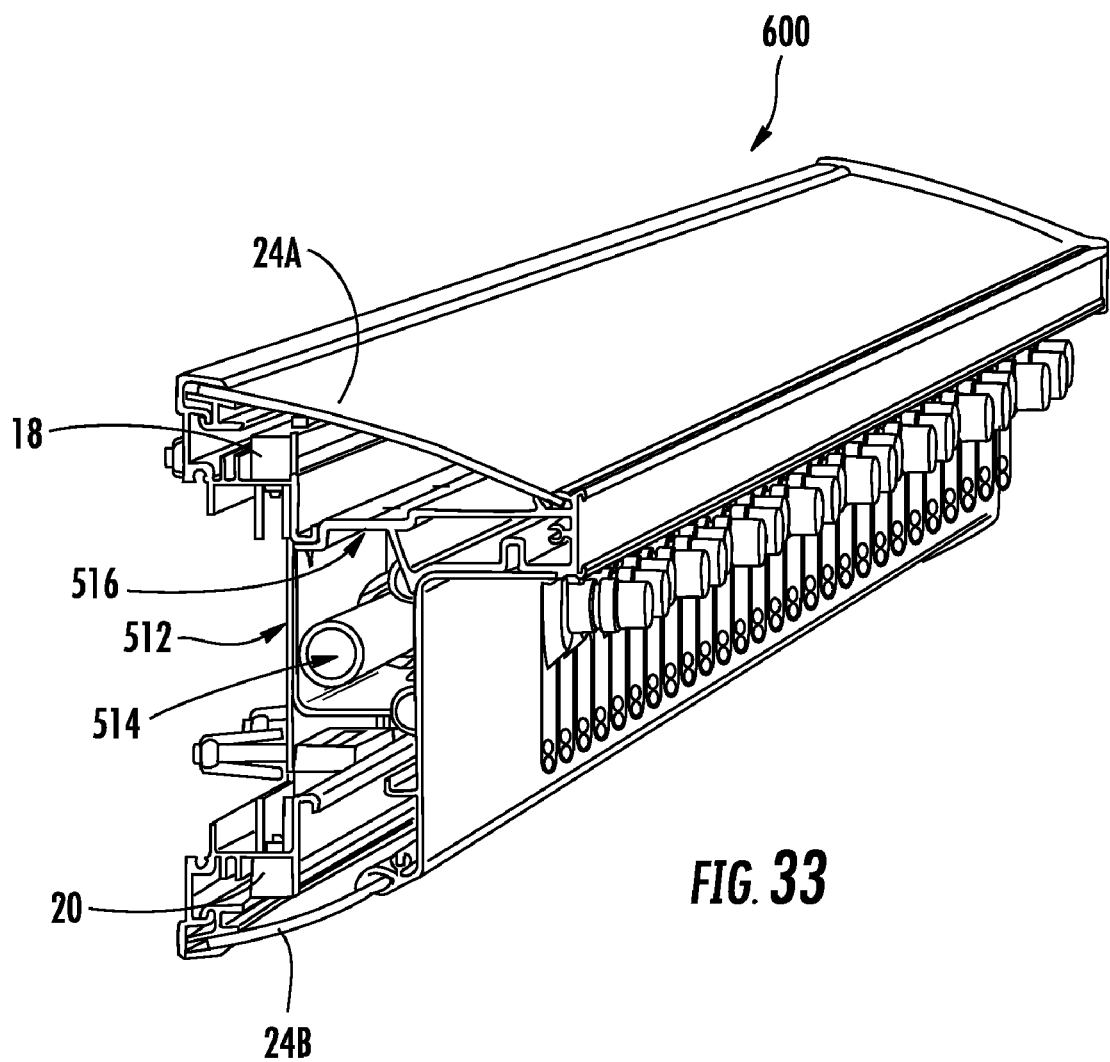
FIG. 33 is a perspective view of a fluid only installation.

Finally, turning to FIG. 33, a combined fluid and equipment management configuration is illustrated and generally indicated at 600. This configuration 600 employs the alternate embodiment mounting bracket 512 as described hereinabove and includes a fluid manifold 514 and equipment management rail 516 mounted thereon. In this regard, in the present configuration 600, the mounting bracket 512 is affixed to a vertical mounting surface such as a wall. The fluid manifold 514 is mounted to the mounting bracket 512 and an equipment management rail 516 mounted to the fluid manifold 514, all components being as described hereinabove.

It should be noted that in both FIGS. 30, 31 and 32, all of the potential locations for power outlets and gas outlets are shown and illustrated. While the assembly is depicted with all such locations shown, not all such locations will be employed in every configuration. These figures are simply directed to being comprehensive in their depiction of all possible configurations and not any single limiting configuration.

It can be further seen that optional lighting components as described above at 18, 20 are installed adjacent top and bottom edges of the mounting bracket 512 and lighting lens panels 24A, 24B are provided in overlying relation concealing the lighting components 18, 20 and completing the outer cover surface of the equipment management configuration 600 such that the contoured outer surfaces all merge together to form a substantially continuous outer contoured surface. Should lighting components 18, 20 not be employed, solid non-translucent panels will be employed for closure of the outer surface of the assembly in place of the lighting lens panels 24A, 24B. In this manner the assembly is configured so that, if desired, lighting components 18, 20 can be and lighting lens panels can be added at a later date as a retrofit without having to replace the entire assembly.

It can therefore be seen that the present invention provides a component-based utility supply system that can be arranged in several different configurations to provide equipment management alone, fluid (gas) and equipment management, power and equipment management, or power, fluid and equipment management, all configurations including optional integrated lighting components. Each system component is uniquely designed with functional components, cover panels and lens panels that merge together at their transition edges to provide continuous outer surface contours that are both aesthetically pleasing and easy to clean and sanitize. The component-based configurations are also easy to install and to couple together in side-by-side arrangements to provide custom length units. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A modular component-based fluid supply apparatus comprising:
    a mounting bracket having a longitudinally extending wall mounting flange, said wall mounting flange having an upper edge and a lower edge;
    a supporting bracket including an upper supporting flange and a lower supporting flange wherein an inner edge of each of said upper and lower supporting flanges are connected to each other by a rear wall extending therebetween, said rear wall being attached to said mounting bracket;
    a one-piece fluid manifold having an upper mounting surface and a lower mounting surface, said upper and lower mounting surfaces being respectively releasably coupled to said upper and lower supporting flanges, said fluid manifold further having a body with a first end and a second end, said body including a plurality of longitudinally extending fluid conduits contained therein and extending from said first end to said second end for supplying fluid along said fluid manifold;
    at least one lighting device disposed adjacent one of said upper and lower supporting flanges; and
    at least one light transmissive lens panel overlying said at least one lighting device wherein said at least one lighting device is operative for supplying light along at least a portion of said fluid supply apparatus.

2. The component-based fluid supply apparatus of claim 1, further comprising:
    an equipment management rail releasably coupled to said fluid manifold.

3. A modular component-based fluid and power supply apparatus comprising:
    a mounting bracket having a longitudinally extending a supporting bracket including an upper supporting flange and a lower supporting flange wherein an inner edge of each of said upper and lower supporting flanges are connected to each other by a rear wall extending therebetween, said rear wall being attached to said mounting bracket;
    a one-piece fluid manifold having upper mounting surface and a lower mounting surface, said upper and lower mounting surfaces being respectively releasably coupled to said upper and lower supporting flanges of said mounting bracket, said fluid manifold further having a body with a first end and a second end, said body including a plurality of longitudinally extending fluid conduits contained therein and extending from said first end to said second end for supplying fluid along said fluid manifold;
    an equipment management rail releasably coupled to said fluid manifold;
    a power distribution assembly having a longitudinally extending back wall panel having an upper edge and a lower edge, said power distribution assembly further including a plurality of longitudinally extending supporting flanges wherein adjacent supporting flanges cooperate to define longitudinally extending power conduits for supplying power along said power distribution assembly;
    at least one lighting device disposed adjacent one of said upper supporting flange of said power distribution assembly and said lower supporting flange of said mounting bracket; and
    at least one light transmissive lens panel overlying said at least one lighting device wherein said at least one lighting device is operative for supplying light along at least a portion of said component-based fluid and power supply apparatus.

4. The component-based fluid and power supply apparatus of claim 3 wherein said fluid manifold has a contoured front facing surface having an upper edge and a lower edge, and said equipment management rail having an upper contoured surface and a lower contoured surface, said lower contoured surface of said equipment management rail merging with the upper edge of said fluid manifold to provide a continuous contoured surface,
    said power distribution assembly further comprising a power distribution face plate having an upper edge and a lower edge and an outer contoured surface extending therebetween, said power distribution face plate being releasably coupled to an upper supporting flange of said power distribution assembly wherein said lower edge thereof is disposed in adjacent relation with said upper contoured surface of said equipment management rail, said at least one lighting device comprises an upper lighting device disposed adjacent said upper supporting flange of said power distribution assembly and a lower lighting device disposed adjacent said lower supporting flange of said mounting bracket, said at least one light transmissive panel comprises an upper light transmissive panel overlying said upper lighting device and having an outer contoured surface that extends between said upper edge of said back wall panel of said power distribution assembly and said upper edge of said power distribution face plate, and further comprises a lower light transmissive panel overlying said lower lighting device and having an outer contoured surface that extends between said lower edge of said wall mounting flange of said mounting bracket and said lower edge of said front facing surface of said supporting flanges, whereby said outer contoured surfaces of said upper light transmissive panel, said power distribution face plate, said equipment management rail, a face cover plate disposed over said fluid manifold, and said lower light transmissive panel form a continuous outer surface.

* * * * *